United States Patent
Marcille et al.

(10) Patent No.: US 11,205,521 B2
(45) Date of Patent: Dec. 21, 2021

(54) OPTIMIZED NUCLEAR FUEL CORE DESIGN FOR A SMALL MODULAR REACTOR

(71) Applicant: SMR Inventec, LLC, Camden, NJ (US)

(72) Inventors: Thomas Marcille, West Linn, OR (US); Joseph Rajkumar, Cherry Hill, NJ (US)

(73) Assignee: SMR INVENTEC, LLC

(*) Notice: Subject to any disclaimer, the term of this patent is extended or adjusted under 35 U.S.C. 154(b) by 714 days.

(21) Appl. No.: 15/927,284

(22) Filed: Mar. 21, 2018

(65) Prior Publication Data

US 2018/0277260 A1    Sep. 27, 2018

Related U.S. Application Data

(60) Provisional application No. 62/474,396, filed on Mar. 21, 2017.

(51) Int. Cl.
*G21C 3/18* (2006.01)
*G21C 15/10* (2006.01)
(Continued)

(52) U.S. Cl.
CPC ............ *G21C 3/18* (2013.01); *G21C 5/02* (2013.01); *G21C 5/06* (2013.01); *G21C 11/06* (2013.01);
(Continued)

(58) Field of Classification Search
CPC ... G21C 3/00; G21C 3/30; G21C 3/32; G21C 3/322; G21C 3/33; G21C 3/336;
(Continued)

(56) References Cited

U.S. PATENT DOCUMENTS 3,929,565 A   12/1975   Fredin et al.
4,499,047 A    2/1985   Bonman et al.
(Continued)

FOREIGN PATENT DOCUMENTS

EP          0266591         5/1988

OTHER PUBLICATIONS

Corresponding International Search Repor and Wnten Opinian for PCT/US2018/023487 dated May 23, 2018.
(Continued)

*Primary Examiner* — Lily C Garner
(74) *Attorney, Agent, or Firm* — The Belles Group, P.C.

(57) ABSTRACT

A fuel core for a nuclear reactor in one embodiment includes an upper internals unit and a lower internals unit comprising nuclear fuel assemblies. The assembled fuel core includes an upper core plate, a lower core plate, and a plurality of channel boxes extending therebetween. Each channel box comprises a plurality of outer walls and inner walls collectively defining a longitudinally-extending interior channels or cells having a transverse cross sectional area configured for holding no more than a single nuclear fuel assembly in some embodiments. A cylindrical reflector circumferentially surrounds channel boxes and is engaged at opposing ends by the upper and lower core plates. Adjacent cells within each channel box are formed on opposite sides of inner walls such that the cells are separated from each other by the inner walls alone without any water gaps therebetween which benefits neutronics for some small modular reactor designs.

19 Claims, 41 Drawing Sheets

(51) Int. Cl.
*G21C 11/06* (2006.01)
*G21C 5/06* (2006.01)
*G21C 5/02* (2006.01)
*G21C 3/324* (2006.01)

(52) U.S. Cl.
CPC ............ *G21C 15/10* (2013.01); *G21C 3/324* (2013.01); *Y02E 30/30* (2013.01)

(58) Field of Classification Search
CPC . G21C 3/34; G21C 3/344; G21C 3/40; G21C 7/00; G21C 7/06; G21C 11/06; G21C 15/10
See application file for complete search history.

(56) References Cited

U.S. PATENT DOCUMENTS

| | | |
|---|---|---|
| 4,548,657 A | 10/1985 | Eddens |
| 4,711,756 A | 12/1987 | Nakazato |
| 4,767,595 A | 8/1988 | Wolters et al. |
| 5,009,840 A * | 4/1991 | Ueda .................. G21C 7/04 376/435 |
| 5,120,489 A | 6/1992 | Dillmann |
| 5,139,735 A | 8/1992 | Dillmann |
| 5,361,279 A | 11/1994 | Kobsa |
| 6,205,196 B1 | 3/2001 | Yamashita et al. |
| 6,596,949 B2 * | 7/2003 | Stimpson .............. G01G 3/141 177/142 |
| 6,813,327 B1 | 11/2004 | Challberg |
| 6,925,138 B2 | 8/2005 | Nakamaru et al. |
| 2002/0080908 A1 | 6/2002 | Nakamaru et al. |
| 2007/0076840 A1 * | 4/2007 | Beati ...................... G21C 3/32 376/442 |
| 2009/0323887 A1 * | 12/2009 | Liu ...................... G21C 3/331 376/441 |
| 2013/0301784 A1 | 11/2013 | Ales et al. |
| 2014/0177779 A1 * | 6/2014 | Harkness ............. G21C 11/06 376/458 |

OTHER PUBLICATIONS

European Search Report issued in European Application No. EP18771098 on Nov. 17, 2020.

* cited by examiner

OPTIMIZED NUCLEAR FUEL CORE DESIGN FOR A SMALL MODULAR REACTOR

CROSS-REFERENCE TO RELATED PATENT APPLICATIONS

The present application claims the benefit of U.S. Provisional Patent Application Ser. No. 62/474,396 filed Mar. 21, 2017, the entirety of which is incorporated herein by reference.

BACKGROUND OF THE INVENTION

The present application generally relates to nuclear reactors suitable for power generation facilities, and more particularly to a nuclear fuel core for such reactors.

A majority of nuclear reactors operating in the world today use light or ordinary water to remove heat from the fuel. Generally speaking, these water-cooled reactors use heat generated by a nuclear chain reaction to heat or boil water, combined with a Rankine steam cycle, to produce electricity. There are two general types of Light Water Reactors (LWRs)—Boiling Water Reactors (BWRs) and Pressurized Water Reactors (PWRs). BWRs operate at a pressure near 1000 psi and use nuclear heat to boil water directly in the reactor vessel, whereas PWRs operate at a much higher pressure of about 2250 psi, to prevent boiling in the reactor vessel. In PWRs, reactor water heat is transferred to a secondary steam generator circuit, where steam produced from boiling is subsequently used to produce electricity. Accordingly, the reactor cores of currently operating PWRs differ significantly from the reactor cores of BWRs in design and operating conditions.

PWR reactors cores are generally housed within a pressure vessel known as a reactor pressure vessel or simply reactor vessel which circulates primary coolant water through the core. A typical nuclear reactor core in a light water reactor comprises a multiplicity of tightly packed "nuclear fuel assemblies" (also referred to as nuclear fuel bundles) which generally may be of square cross section in the U.S. Each nuclear fuel assembly is generally an assemblage of multiple "nuclear fuel rods" which are sealed hollow cylindrical metal tubes (e.g. stainless steel or zirconium alloy) packed with enriched uranium fuel pellets and integral burnable poisons arranged in an engineered pattern to facilitate as uniform a "burning" profile of the nuclear fuel assembly (in both the axial and cross sectional/transverse directions) as possible. Control rod assemblies in a PWR are generally removably inserted directly into the fuel assemblies from above between the fuel rods and used to regulate the nuclear fission reaction. In a BWR, the control assemblies are generally inserted between fuel assemblies from the bottom.

The spacing and arrangement of nuclear fuel assemblies in the reactor core may significantly affect the neutronics. Neutronics relates to the physics of neutrons and their travel through materials in the core and the resulting fission reactions. Neutronics therefore affects the performance and power level of the reactor. In conventional PWR reactors, the fuel assemblies are arranged in an open lattice without any physical barriers between them. This creates homogeneous thermal hydraulic conditions since there is no hydraulic isolation of each fuel assembly from adjacent assemblies. For some PWR reactor core designs such as the current small modular reactor (SMR) design platform, this conventional arrangement may detrimentally affect the desired neutronics.

Improvements are desirable in PWR cores especially for SMRs.

SUMMARY OF THE INVENTION

A nuclear reactor fuel core suitable for a small modular reactor (SMR) is provided which is configured and constructed to improve the neutronics of the reactor. In one embodiment, the reactor fuel core may comprise a fuel assembly support system including plurality of vertically-extending channel boxes each configured to hold a plurality of fuel assemblies therein. The channel boxes provide channeled flow of primary coolant in the reactor vessel through the fuel assembly. The channel boxes may have a rectangular prismatic or cuboid configuration in some embodiments. Each channel box may comprise perpendicularly oriented external or outer walls and internal or inner walls which intersect the outer walls perpendicularly in one embodiment. The inner walls divide the space within each channel box into a plurality of interior channels or cells each having a transverse cross section configured for holding no more than a single nuclear fuel assembly. Adjacent cells within each channel box formed on opposite sides of the inner walls are separated from each other by the single thickness inner walls alone with no open water gaps formed therebetween which thereby benefits the neutronics of the core. Advantageously, the inner wall structure of the channel boxes further serve to structurally reinforce the channel box to eliminate or minimize neutron induced permanent bowing or deformation over time which adversely affects full and proper insertion of reaction control rods.

The present channel boxes function to thermally and hydraulically isolate the fuel assemblies from each other. The channel boxes serve as semi-permanent metallic boxes, which remain within the fuel core when the nuclear fuel assemblies are replaced for refueling the reactor. Combination of the channel boxes and cruciform control rod blades in one embodiment facilitates a significant reduction in the number and cost of control elements required (as compared with PWR-conventional rod control clusters assemblies and un-channeled cores), and operational safety via substantial core shutdown margin and reactivity control of the reactor.

The small modular reactor disclosed herein may be a natural circulation PWR. The lack of primary coolant circuit cooling pumps dictates that SMR core design/geometry differ from traditional pumped-flow PWRs to aid such natural circulation which relies on temperature differentials as the means to induce and create flow of primary coolant through the reactor vessel and accompany steam generator. In some embodiments, the present SMR may operate at a design temperature of about 610 degrees F. and a pressure of 2500 psia (2250 psia nominal) to induce gravity flow circulation of primary coolant. The nuclear and thermal hydraulic performance (for optimized core performance and flow stability) requires the design to be able to control the flow distribution radially. The present SMR design advantageously adapts critical geometry aspects found in both BWRs and PWRs and modifies them to enhance the nuclear and thermal performance of the core, and neutronics.

In one aspect, a nuclear fuel core for supporting nuclear fuel assemblies includes: a longitudinal axis; an upper core plate; a lower core plate; a plurality of vertically elongated channel boxes extending between the upper and lower core plates, each channel box comprising outer walls and inner walls collectively defining a plurality of longitudinally-extending interior cells each having a transverse cross sectional area configured for holding no more than a single nuclear fuel assembly; and a cylindrical reflector circumferentially surrounding the channel boxes, the upper and lower core plates coupled to opposing ends of the reflector; wherein adjacent cells within each channel box are separated from each other by the inner walls.

In another aspect, a nuclear fuel core for a nuclear reactor includes: a longitudinal axis; an upper core plate; a lower core plate; a plurality of vertically elongated prismatic channel boxes extending between the upper and lower core plates, each channel box comprising a plurality of outer walls and inner walls collectively defining a plurality of longitudinally-extending interior cells each containing a single nuclear fuel assembly, each channel box separated from adjacent channel boxes by peripheral water gaps formed between the outer walls of the channel boxes; a plurality of cruciform control rods slideably inserted through the peripheral water gaps from above the upper core plate for vertical movement between the channel boxes; and a cylindrical reflector circumferentially surrounding the channel boxes, the upper and lower core plates engaging opposing ends of the reflector; wherein the fuel assemblies within each channel box are separated from each other by the inner walls.

In another aspect, a nuclear fuel core for a nuclear reactor includes: a vertically elongated reactor vessel defining an internal cavity and a longitudinal axis; an upper internals unit disposed in the internal cavity, the upper internals unit comprising: a top support plate, an upper core plate spaced vertically apart from the top support plate, and an intermediate support plate spaced therebetween; a plurality of flow tubes extending between the intermediate support plate and upper core plate; and a plurality of tie rods coupling the top support plate to the upper core plate through the intermediate support plate to form a self-supporting assemblage removably insertable in the reactor vessel as a single unit; a lower internals unit disposed in the internal cavity comprising a plurality of fuel assemblies defining a fuel core, the lower internals unit further comprising: a plurality of vertically elongated channel boxes extending between the upper core plate of the upper internals unit and a lower core plate, each channel box comprising a plurality of outer walls and a plurality of inner walls collectively defining a plurality of longitudinally-extending interior cells each containing a single nuclear fuel assembly; and a cylindrical reflector circumferentially surrounding the channel boxes, the upper and lower core plates disposed on opposing ends of the reflector; wherein each channel box is vertically aligned with a respective flow tube in the upper internals unit to form a flow path therebetween. In various embodiments, the fuel assemblies within each channel box are separated from each other by the inner walls, each channel box is separated from adjacent channel boxes by peripheral water gaps formed between the outer walls of the channel boxes, and a plurality of cruciform control rods are slideably inserted in the peripheral water gaps for vertical movement therein to control reactivity in the reactor.

It is to be understood that the various aspects and features of the invention described herein can be combined in many various ways and combinations. Moreover, further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The features of the exemplary embodiments will be described with reference to the following drawings in which like elements are labeled similarly, and in which.

Figure 1:
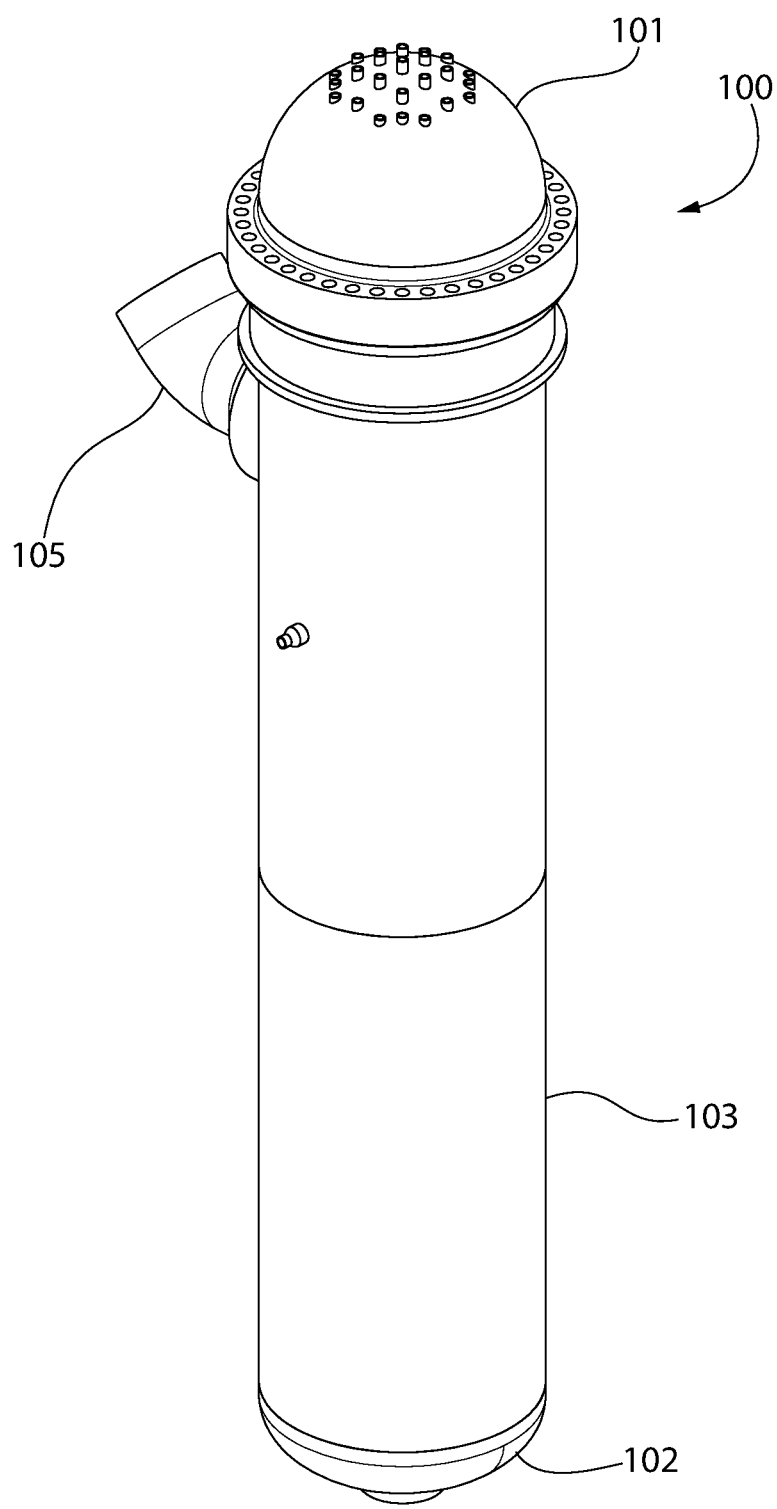
FIG. 1 is a perspective view of a nuclear reactor pressure vessel including a fuel core according to an embodiment of the present disclosure.
Figure 2:
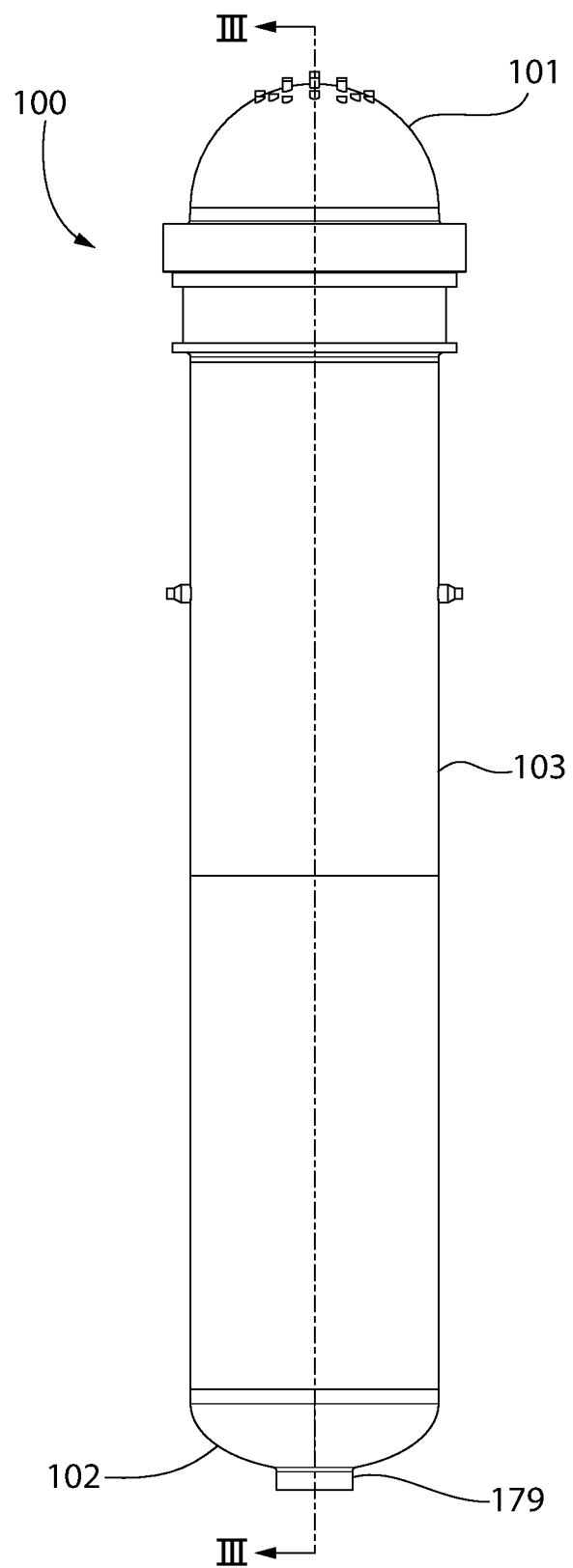
FIG. 2 is a side view thereof.

All drawings are schematic and not necessarily to scale. Parts given a reference numerical designation in one figure may be considered to be the same parts where they appear in other figures without a numerical designation for brevity unless specifically labeled with a different part number and described herein

DETAILED DESCRIPTION

The features and benefits of the present disclosure are illustrated and described herein by reference to exemplary ("example") embodiments. This description of exemplary embodiments is intended to be read in connection with the accompanying drawings, which are to be considered part of the entire written description. Accordingly, the present disclosure expressly should not be limited to such embodiments illustrating some possible non-limiting combination of features that may exist alone or in other combinations of features; the scope of the claimed invention being defined by the claims appended hereto.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "coupled," "affixed," "connected," "interconnected," and the like refer to a relationship wherein structures are secured or attached to one another either directly or indirectly through intervening structures, as well as both movable or rigid attachments or relationships, unless expressly described otherwise.

FIGS. 1-25 depict a non-limiting embodiment of a nuclear pressurized water reactor (PWR) in the form of a small modular reactor (SMR) including a reactor pressure vessel 100 ("reactor vessel" for brevity hereafter) comprising a fuel core with a fuel assembly support system according to the present invention which exhibits improved neutronics.

Reactor vessel 100 comprises a longitudinal axis LA, top head 101, bottom head 102, and a cylindrical shell 103 extending between the heads. Top head 101 may be bolted to the shell 103 in one embodiment to access the core, or welded in other embodiments. Reactor vessel 100 defines a longitudinally extending internal cavity 104 configured for holding the reactor internals. The reactor internals include an upper internals unit 110 and lower internals unit 112 (see, e.g. FIGS. 3 and 25). The lower internals unit 112 contains the fuel assemblies 124 and defines the nuclear fuel core 120. The upper internals unit 110 provides a structure for movably supporting and guiding the control rods 150 inserted in the fuel core to control the reaction and power output. The lower internals unit 112/fuel core 120 (shown schematically in FIG. 3) is disposed within cavity 104 in a lower portion of the reactor vessel. The upper portion of the cavity 104 of the reactor vessel 100 contains the upper internals unit 110 which is vertically stacked on top of the lower internals unit 112 which the reactor is fully assembled.

Referring particularly to FIGS. 20-25, the upper internals unit 110 comprises a metallic tubular shell or shroud 107 of cylindrical shape which is removably inserted within the reactor vessel cavity 104 on top of the fuel core 120 (lower internals unit 112). Shroud 107 is in fluid communication with reactor core 120, and closely coupled thereto for upflow of primary coolant from through the core directly into the shroud which forms a riser. Shroud 107 is spaced inwardly from the interior surface of shell 103 and concentrically aligned thereto. This defines an annular downcomer region 108 between the shell and shroud. Shroud 107 may be formed of a corrosion resistant metal, such as for example stainless steel or other materials.

The upper internals unit 110 further includes (from top to bottom) a top support plate 135, intermediate support plate 139, and an upper core plate 125 arranged in vertically spaced relationship. The foregoing plates may be formed of a suitable metal such as steel or other. The space between the top and intermediate support plates 135, 139 within shroud 107 defines an upper flow plenum 165. A plurality of rectangular prismatic shaped metallic flow tubes 166 extend vertically between the intermediate support plate 139 and upper core plate 125. The flow tubes may have a rectilinear transverse cross-sectional shape and can include a combination square tubes 166a and rectangular tubes 166b in cross section which become axially aligned with complementary configured channel boxes 130 when installed in the reactor vessel 100, as further described herein. The flow tubes 166 have open tops and bottoms and are in fluid communication with each fuel assembly 124 disposed in the fuel core 120 below for receiving circulating primary coolant from the channel boxes.

Referring particularly to FIGS. 15-19, the upper core plate 125 comprises an open metal lattice or grid structure defining a plurality of rectilinear cells or flow openings 127 each configured to fluidly communication with a single channel box 130 disposed in the fuel core 120, as further described herein. When inserted into the reactor vessel 100, the upper core plate 125 may abuttingly engage the tops of the plurality of channel boxes 130 to form a relatively tight fluid connection. In one embodiment, as shown, the flow openings 127 may include a combination of square openings 127a for mating with channel boxes 130 having a square transverse cross section and rectangular openings 127b for mating with channel boxes having a rectangular transverse cross section. The flow openings 127 are arranged in spaced apart linear horizontal rows (as shown) separated transversely extending portions of the grid body structure. The upper core plate 125 may include a polygonal-shaped perimeter portion with a multiple stepped configuration arranged to engage the complementary configured multiple stepped interior surface 200 of the cylindrical reflector 121 (see, e.g. FIG. 4) to operably key and lock the upper core plate in rotational position relative to the cylindrical reflector. The upper core plate 125 further includes tie rod openings 142 for inserting tie rods 134 therethrough which hold the upper internals unit 110 together, as further described herein.

Figure 30:
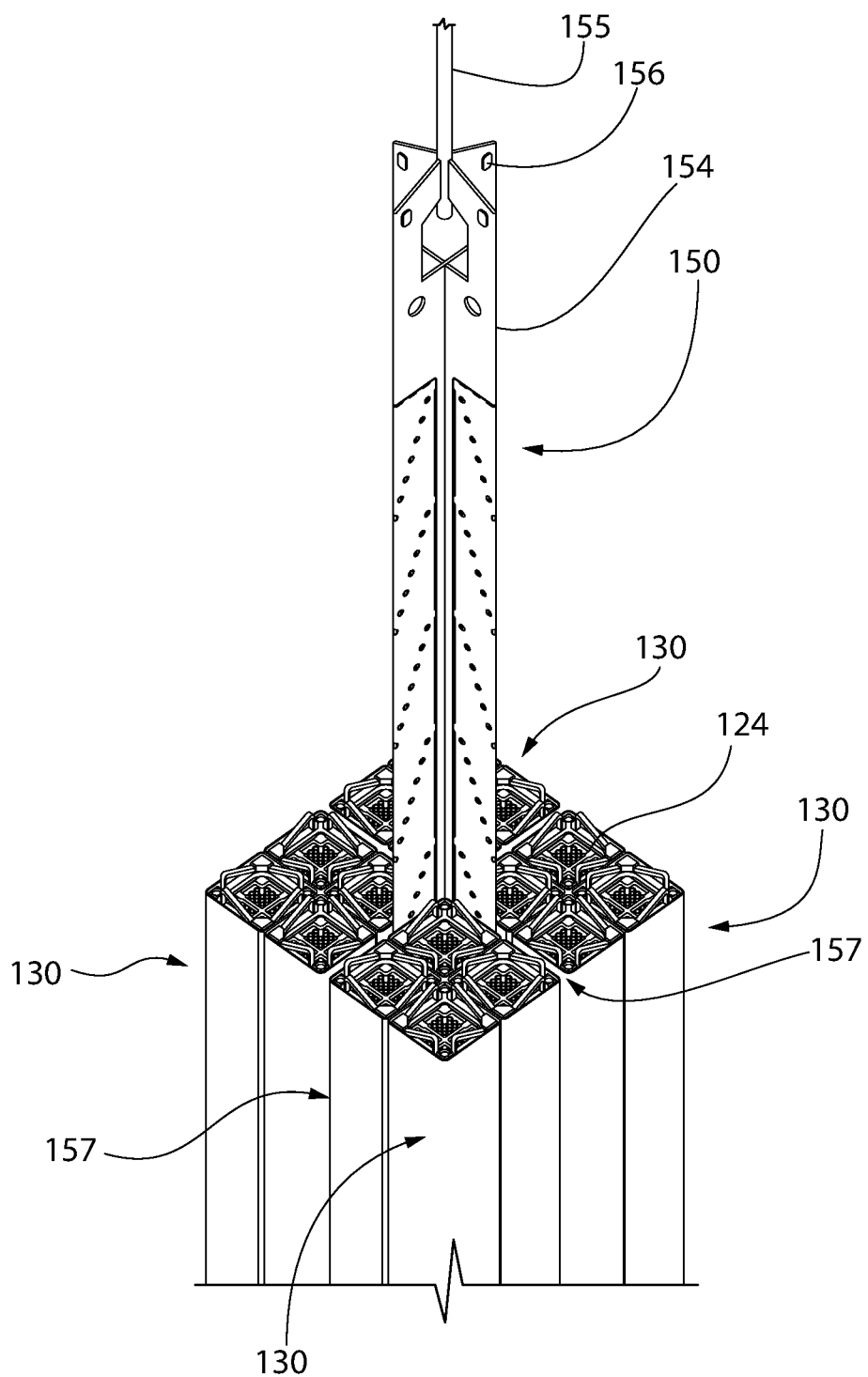
FIG. 30 is a top perspective view of a cluster of four channel boxes showing the control rod partially inserted between corner regions of the boxes in the water gap.

A plurality of cruciform shaped control rod openings 171 formed in the upper core plate 125 slideably receive a complementary configured cruciform shaped bladed portion of a control rod 150 therein (see, e.g. FIG. 30). The control rod openings 171 are arranged in a wide array covering the full extent of the upper core plate 125. Each control rod opening 171 may be disposed proximate to adjacent corner regions formed between the square and/or rectangular cells 127, as shown. This allows the control rods to be inserted between channel boxes 130 in the fuel core 120 in peripheral water gaps 157 formed between adjacent channel boxes, and not inside the fuel assemblies. Unlike a PWR core comprised of large (e.g., 8"×8") conventional PWR fuel assemblies that uses rod cluster control assemblies (RCCAs) inserted into guide tubes within the fuel assemblies, reactivity in the present SMR fuel core 120 is regulated by control blades that are cruciform in shape, located outside of the fuel assemblies, and which are inserted from the top of the core. This advantageously allows for a substantial reduction of the number of control rod drive mechanisms (CRDMs) required to achieve sufficient reactivity control and shutdown margin. In addition, inserting control blades outside of the channel box 130 assemblies allows for unobstructed paths from the top of the reactor pressure vessel for insertion of in-core instruments within fuel assemblies 124 (e.g., inside of the channel boxes) needed to monitor core power distributions. Possible interference from neighboring components in the core is thus avoided which might snag and impede full insertion of the control rods 150. This further advantageously eliminates the need for penetrations at the bottom of the reactor pressure vessel for both control rod drives and in-core instruments for example.

Figure 44:
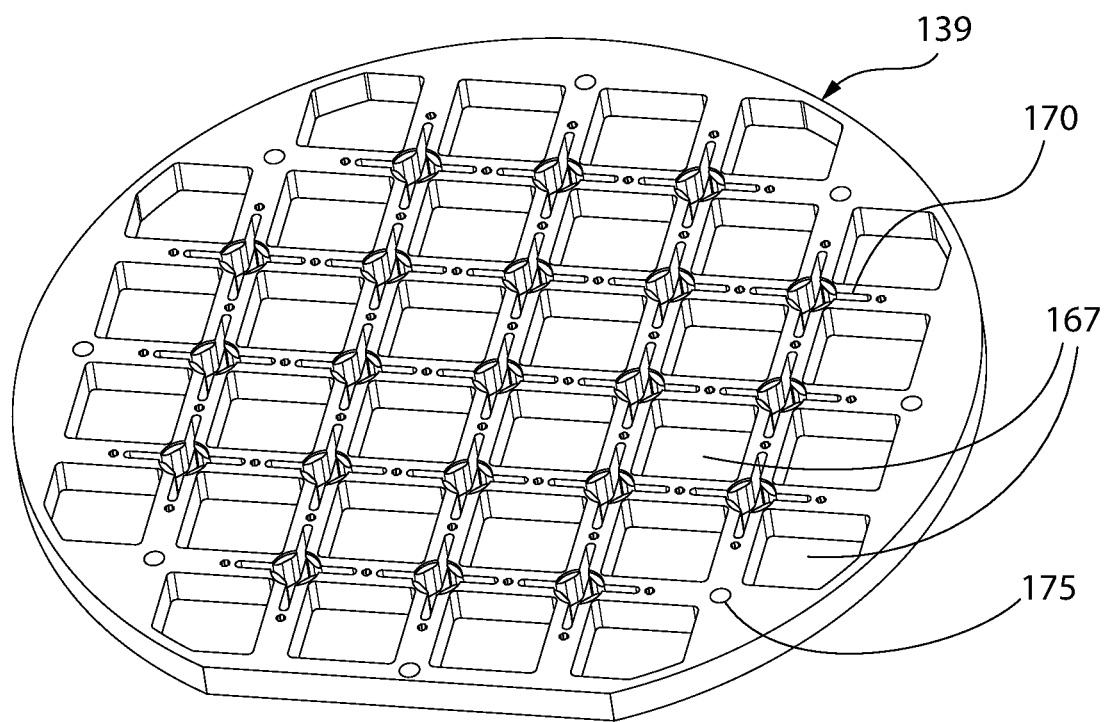
FIG. 44 is a perspective view of an intermediate support plate of the upper internals unit.

The intermediate support plate 139 (best shown in FIG. 44) is similarly a metal lattice or grid structure which includes a plurality of rectilinear shaped flow openings 167 which place the flow tubes 166 in fluid communication with upper flow plenum 165. Flow tubes 166 are therefore each axially aligned with a respective flow opening in the intermediate support plate 139 and a respective flow opening 127 in the upper core plate 125 (see, e.g. FIGS. 23-24) which also places each flow tube in fluid communication with the fuel core 120, as further described herein. Interspersed between flow openings 166 are a plurality of cruciform shaped openings 170 of similar configuration to and for the same purpose as cruciform shaped openings 171 in the upper core plate 125.

A plurality of metal control rod guide tubes 172 extend between the top and intermediate support plates 135, 139. Each tube 172 is coaxially aligned with one of a plurality of circular holes 173 formed through the top support plate 135 and one of the cruciform control rod openings 170 in the intermediate support plate 139. It bears noting that the control rod guide tubes 172 may have diameters larger than holes 173 in the top support plate 135 to define spacers which hold the top support plate 135 in spaced relation to the intermediate support plate 139 when the upper internals assembly is compressed by the tie rods 134.

The upper internals unit 110 of the reactor may therefore be held together by a plurality of vertically-extending tie rods 134 in one embodiment which are fastened to each of the top support plate 135 and upper core plate 125 by fasteners such as threaded nuts 174. Tie rod holes 175 in the intermediate support plate 139 allow the tie rods 134 to pass completely through this plate without engagement. When the upper internals unit 110 is assembled, the tie rods 134 are tightened which compresses the control rod guide tubes 172, intermediate support plate 139, and flow tubes 166 between the top support plate 135 and upper core plate 125 forming a self-supporting assemblage or structure which can be transported and inserted into or removed from the cavity 104 of the reactor vessel 100 as single unit. It bears noting that the space formed between the intermediate support plate 139 and upper core plate 125 within shroud 107 provides a compartment or area in the upper internals unit 110 for selectively withdrawing the cruciform shaped control rods 150 to control the nuclear reaction and power production. The control rods 150 are vertically movable up and down in this compartment between the flow tubes 166.

In operation, core cooling water referred to as "primary coolant" in the art circulates through the reactor vessel 100, upper internals unit 110, and fuel core 120 (lower internals unit 112) between a primary coolant inlet nozzle 105 and a primary coolant outlet nozzle 106. In one embodiment, the inlet and outlet nozzles 105, 106 may be combined in a single common primary coolant fluid coupling 109 connected directly to the shell 103 of reactor vessel 100 as shown. In one construction, the combined inlet-outlet flow nozzles 105/106 may be formed by two concentric hollow forgings which define the outer inlet nozzle 105 and the inner outlet nozzle 106. Inlet nozzle 105 is therefore nested inside outlet nozzle 106 in this arrangement. The outlet nozzle 106 has one end welded to the reactor shroud 107 (internal to the reactor vessel shell 103) and an opposite end configured for welding to an inlet nozzle of a steam generator vessel which receives primary coolant from the reactor vessel 100 to produce steam for a Rankine power generation cycle (not shown). Such a steam generator is shown for example in commonly-owned U.S. Pat. No. 9,892,806, which is incorporated herein by reference. The inlet nozzle 105 has one end welded to the reactor vessel shell 103 and an opposite end configured for welding to an outlet nozzle of the steam generating vessel. Inlet nozzle 105 is in direct fluid communication with the annular downcomer region 108. Regarding the primary coolant flow path, primary coolant in a cooled state from the steam generator enters reactor vessel 100 through inlet nozzle 105 and flows downward through the annular downcomer region to the bottom of the reactor vessel. The flow enters the reactor core 120 and is heated by the fuel assemblies 124 causing the primary coolant to rise into shroud 107 of the upper internals unit 110 via natural circulation in one embodiment. The heated primary coolant rises through the flow tubes 166 and collects in the upper flow plenum 165. The primary coolant exits the upper flow plenum 165 through a lateral opening 168 in the shroud 107 (see, e.g. FIG. 25) and enters the outlet nozzle 106 from which the coolant flows back to the steam generator.

The foregoing reactor vessel, nozzles, and components of the upper internal unit 110 may be formed of a preferably corrosion resistant metal, such as stainless steel for example in one non-limiting embodiment. Other suitable metallic materials however may be used and does not limit the invention.

The lower internals unit 112 of the reactor which defines the fuel core 120 will now be further described. Referring to FIGS. 4-19, the fuel core comprises a plurality of vertically-extending fuel assemblies 124 each including a multiplicity of hollow fuel rods 160 each containing nuclear fuel pellets such as uranium which generates heat to heat the primary coolant in the reactor vessel 100. The fuel assemblies 124 may have a square cross-sectional shape in one embodiment and include a top flow nozzle structure 161 including lifting members 162 for rigging to move and place the fuel assembly in the core.

A vertically elongated metallic cylindrical reflector 121 surrounds the core of fuel assemblies 124 which helps to protect the reactor pressure vessel 100 from embrittlement caused by fast spectrum neutrons (>1 MeV), while additionally reflecting thermal neutrons back towards the core. Reflector 121 has an annular body in transverse cross section that defines an interior space 123 configured to receive the plurality of fuel assemblies 124 therein. Reflector 121 may have substantially the same diameter as the upper shroud 107 which may engage and be supported by the reflector. In one embodiment, the reflector 121 may be comprised of a plurality of vertically stacked annular ring segments 122 to facilitate assembly of the reflector within the lower portion of the reactor vessel 100. The reflector segments 122 are tightly abutted together to form an integral cylindrical wall. In one embodiment connecting rods 176 which extend vertically from the upper-most reflector segment 122 to the lower-most segment may be provided to tie the structure together and properly align each segment rotationally to the adjoining segments. The connecting rods 176 allow for a degree of thermal expansion between the reflector segments 122. A plurality of vertically-extending cooling conduits 139 may be provided which are integrally formed completely through each segment 122 from top to bottom for cooling the cylindrical reflector 121. Primary coolant may therefore circulate vertically through the concentrically aligned conduits in each segment for cooling. The connecting rods 176 ensure that the cooling conduits 139 are properly aligned to adjoining cooling conduits in other reflector segments 122. In other possible embodiments, it bears noting that the reflector may comprise a single monolithic annular cylindrical structure or body. The reflector 121 may be made of a suitable metal, which preferably may be corrosion resistant such as stainless steel or others.

Figure 4:
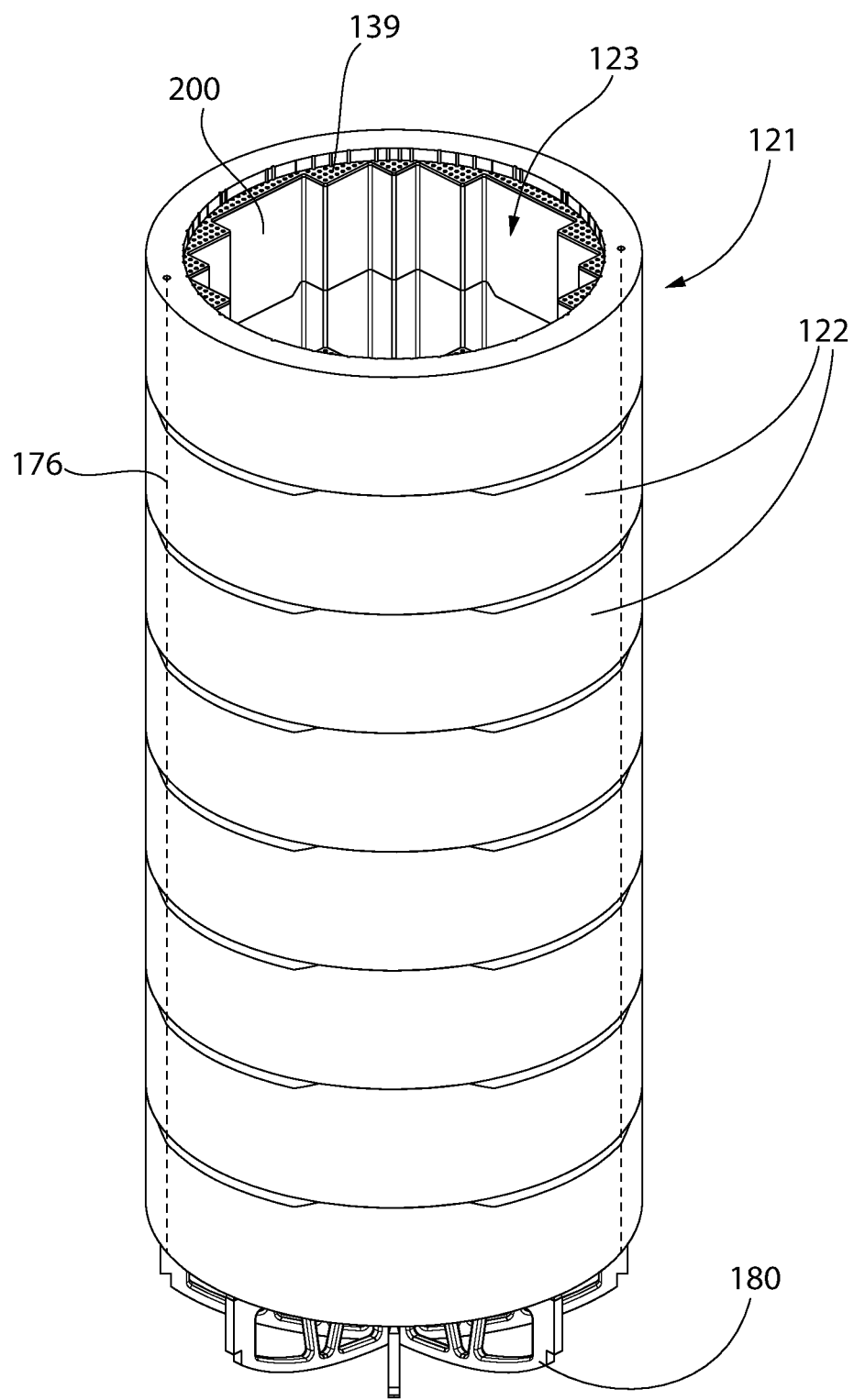
FIG. 4 is top perspective view of the reflector assembly of the fuel core with fuel assemblies and other internals removed for clarity.
Figure 5:
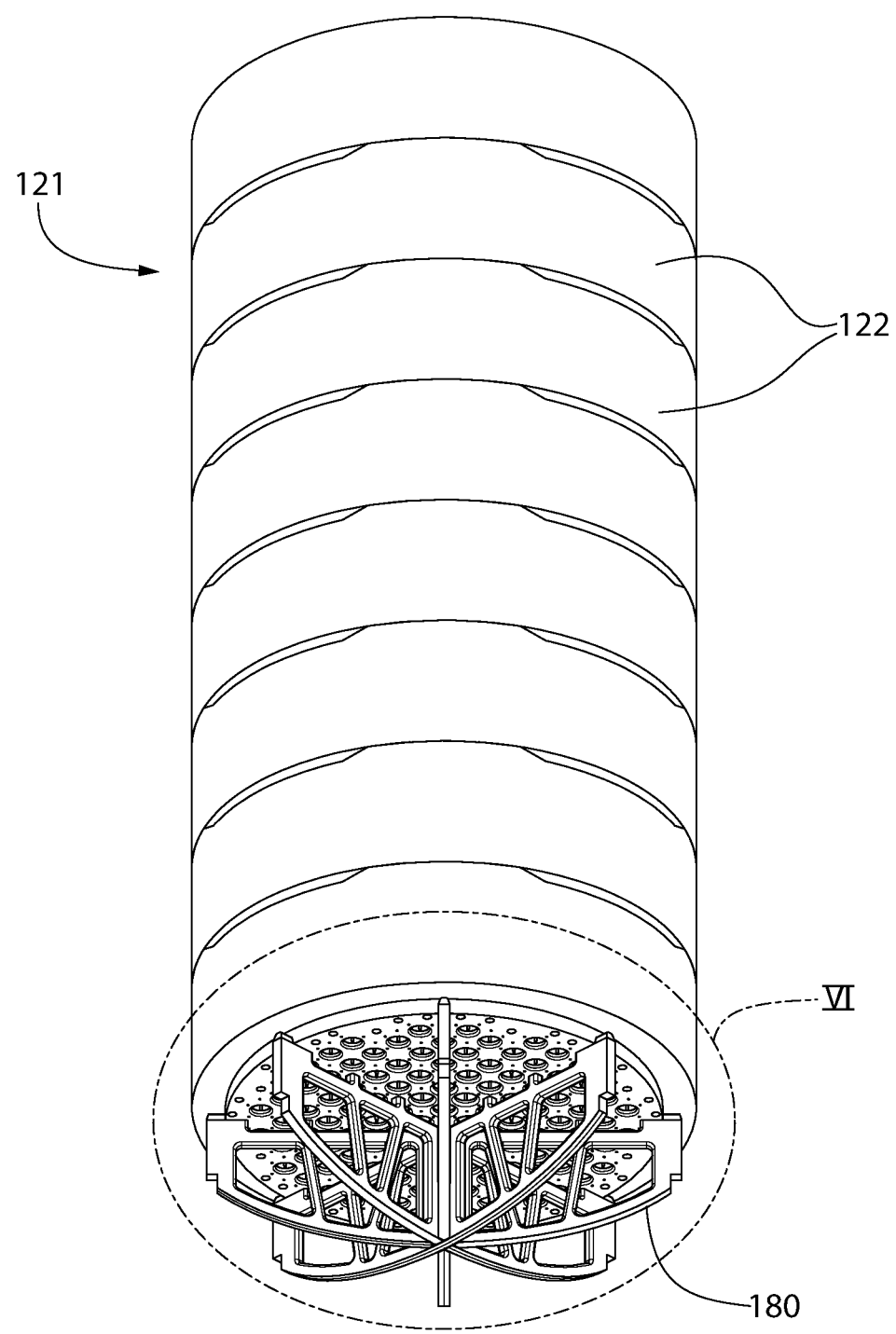
FIG. 5 is bottom perspective view thereof.
Figure 6:
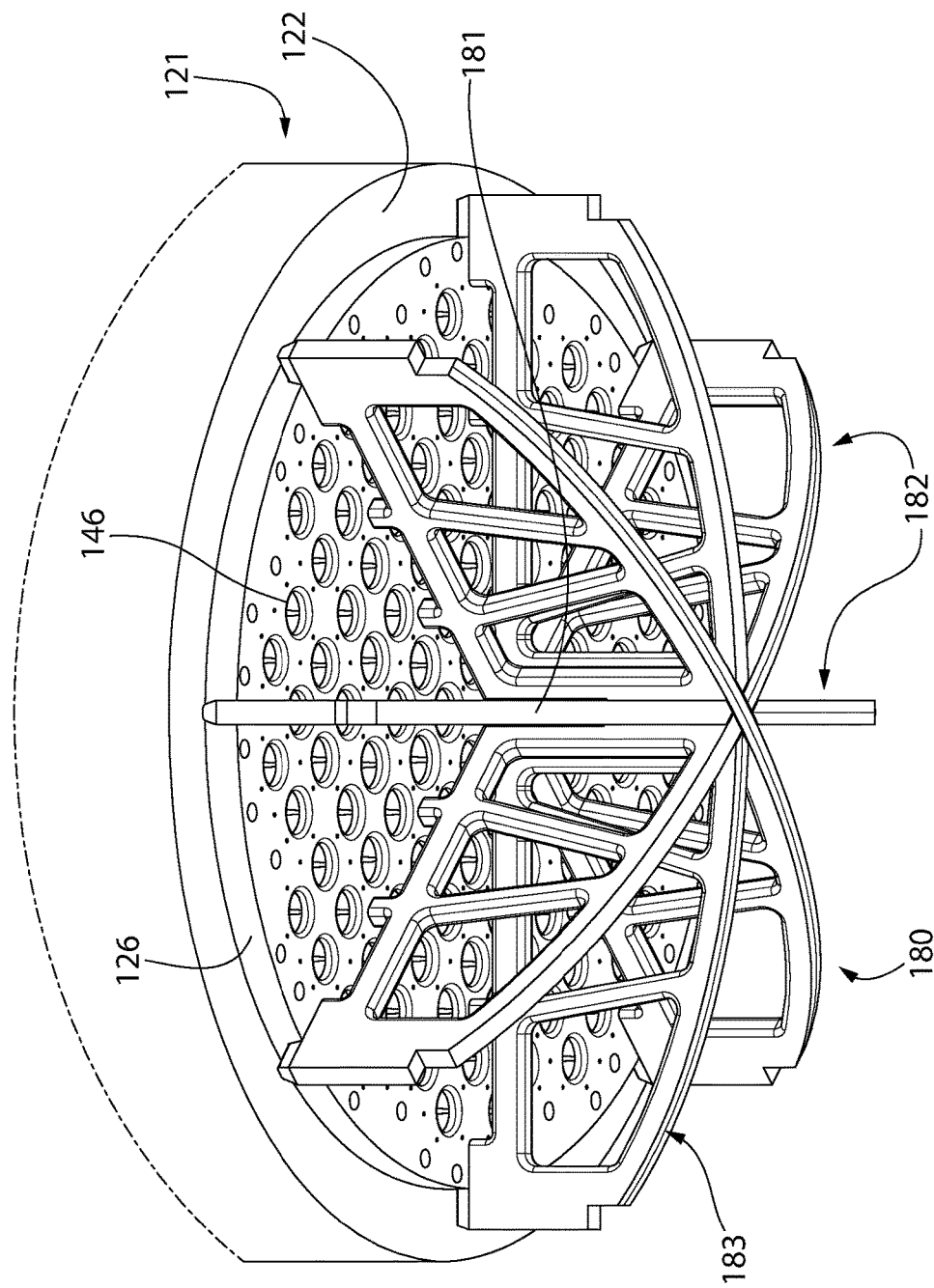
FIG. 6 is close-up view taken from FIG. 5.
Figure 7:
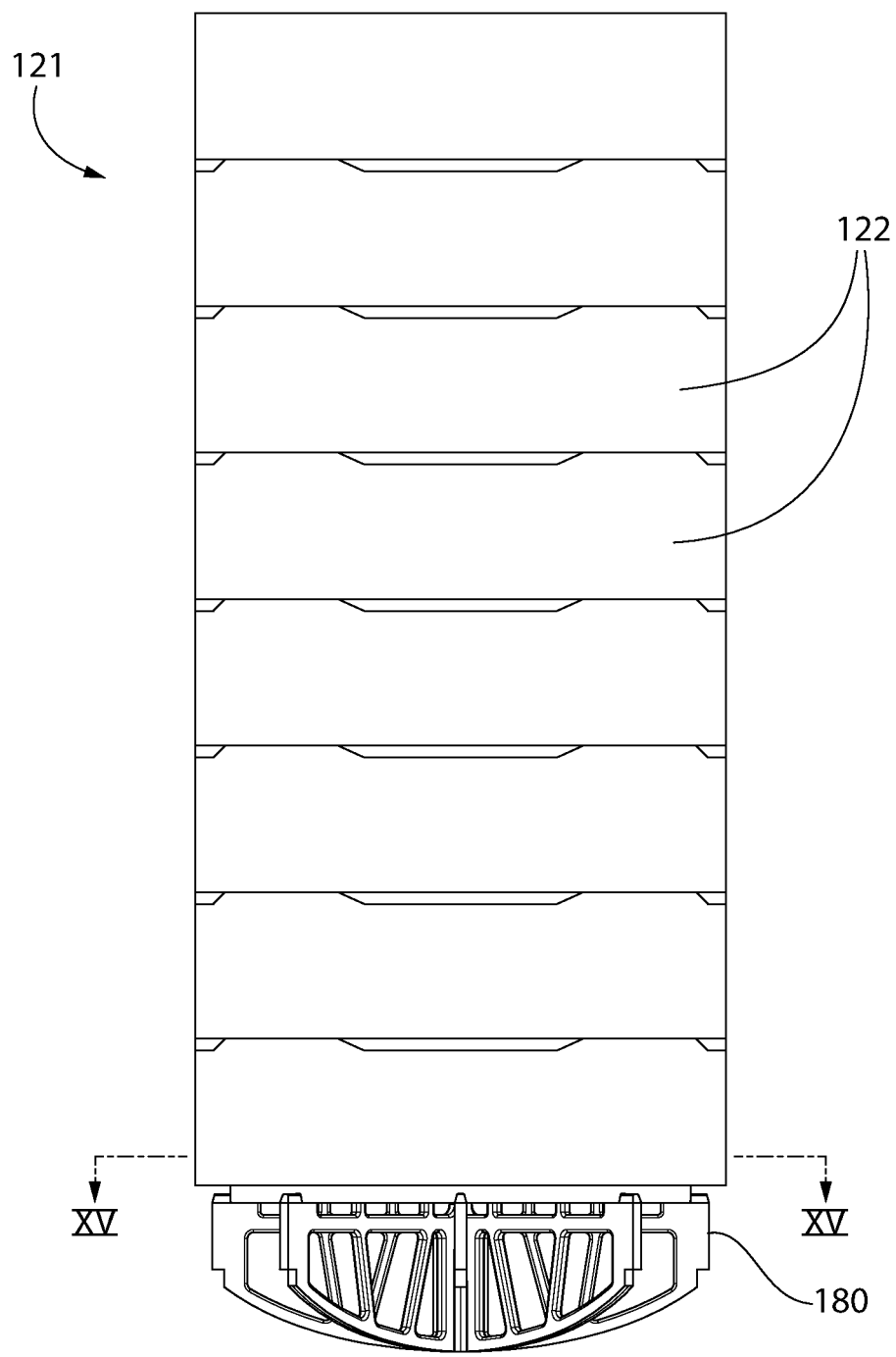
FIG. 7 is a side view of the reflector assembly of FIG. 4.
Figure 8:
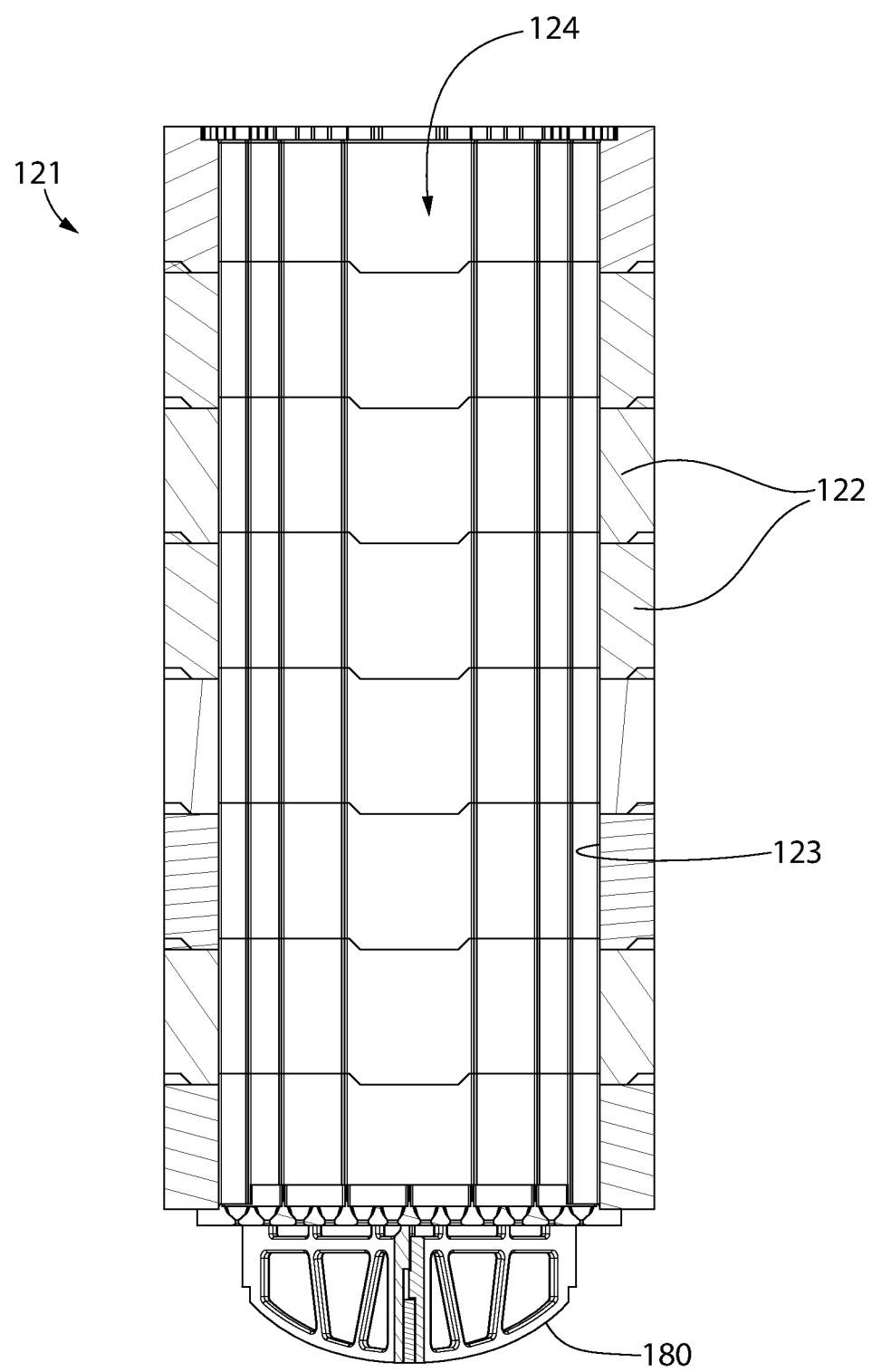
FIG. 8 is cross-sectional view thereof.
Figure 9:
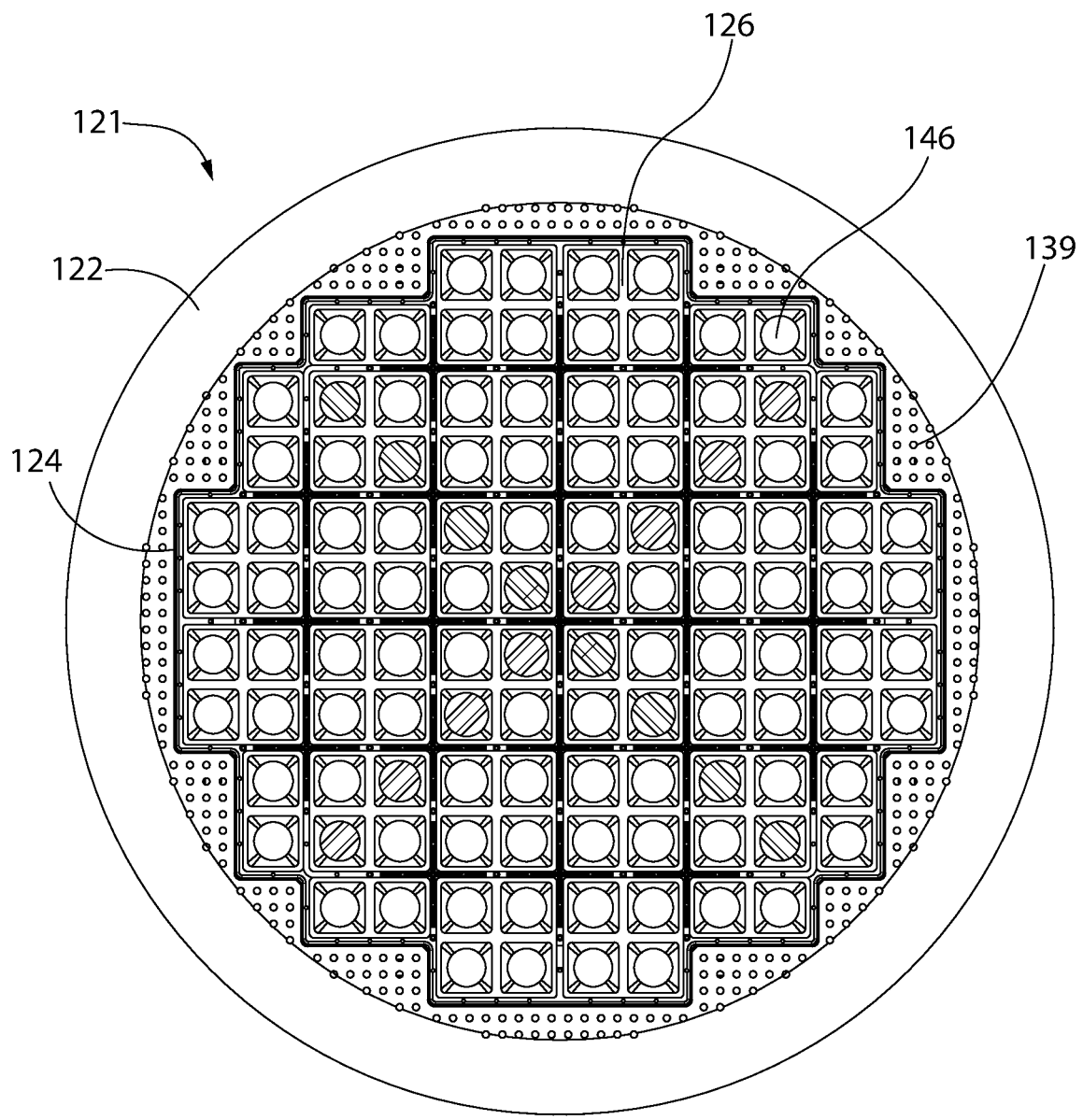
FIG. 9 is a top plan view thereof.
Figure 10:
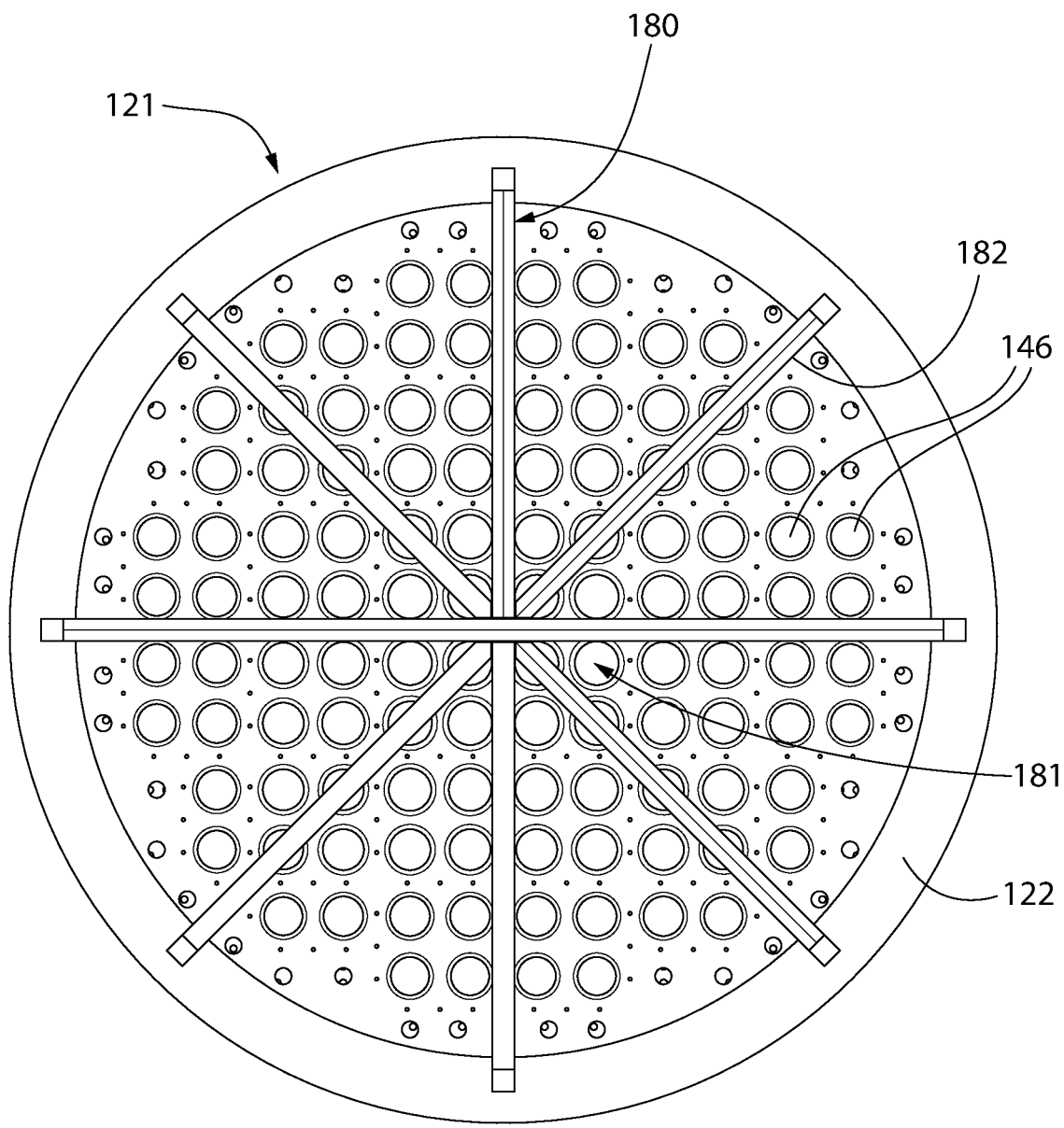
FIG. 10 is a bottom plan view thereof.
Figure 11:
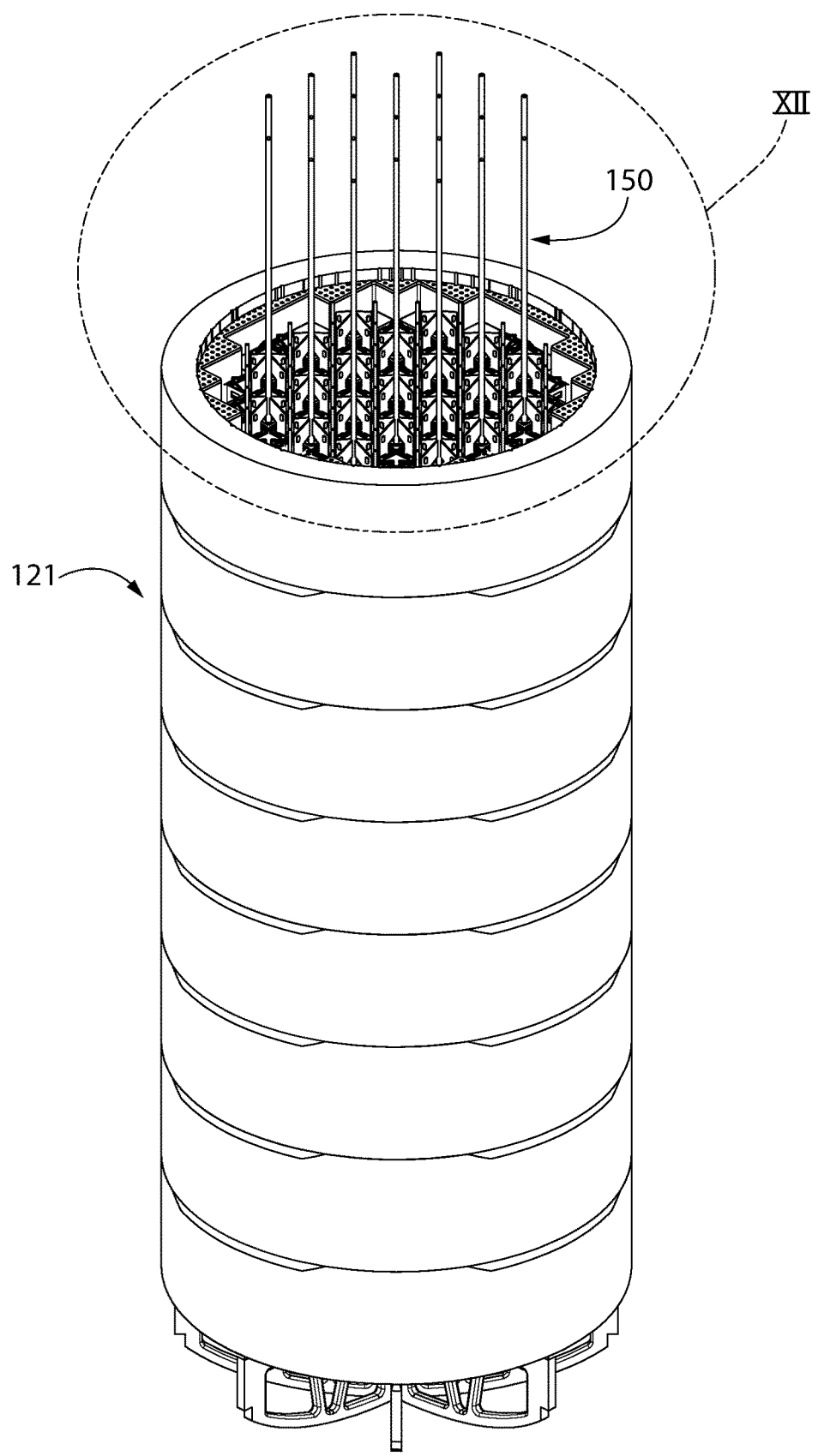
FIG. 11 is top perspective view of the fuel core similar to FIG. 4 but showing the fuel assembly, channel boxes, control rods, and other appurtenances in place.
Figure 12:
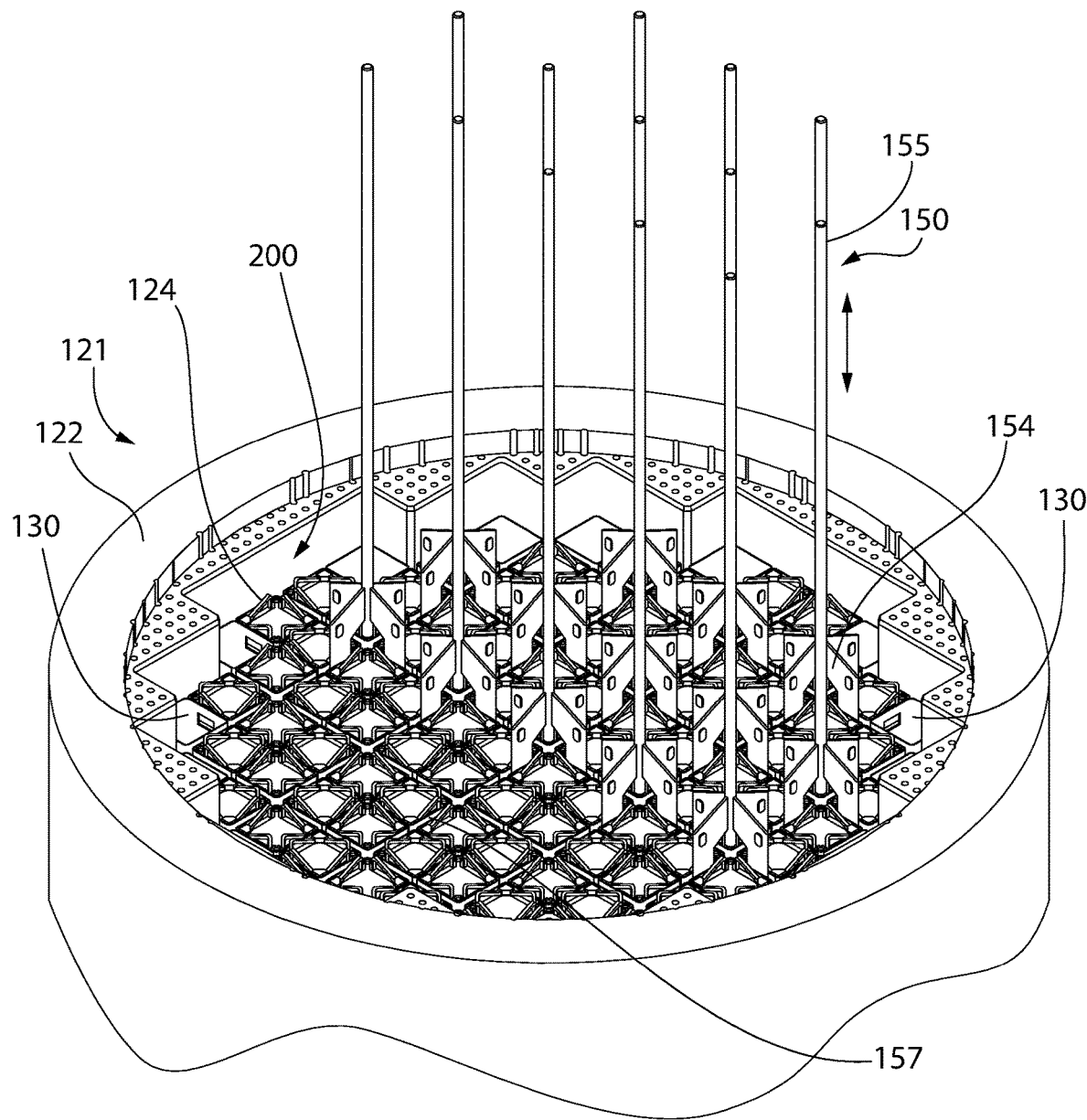
FIG. 12 is a close-up view taken from FIG. 11.
Figure 13:
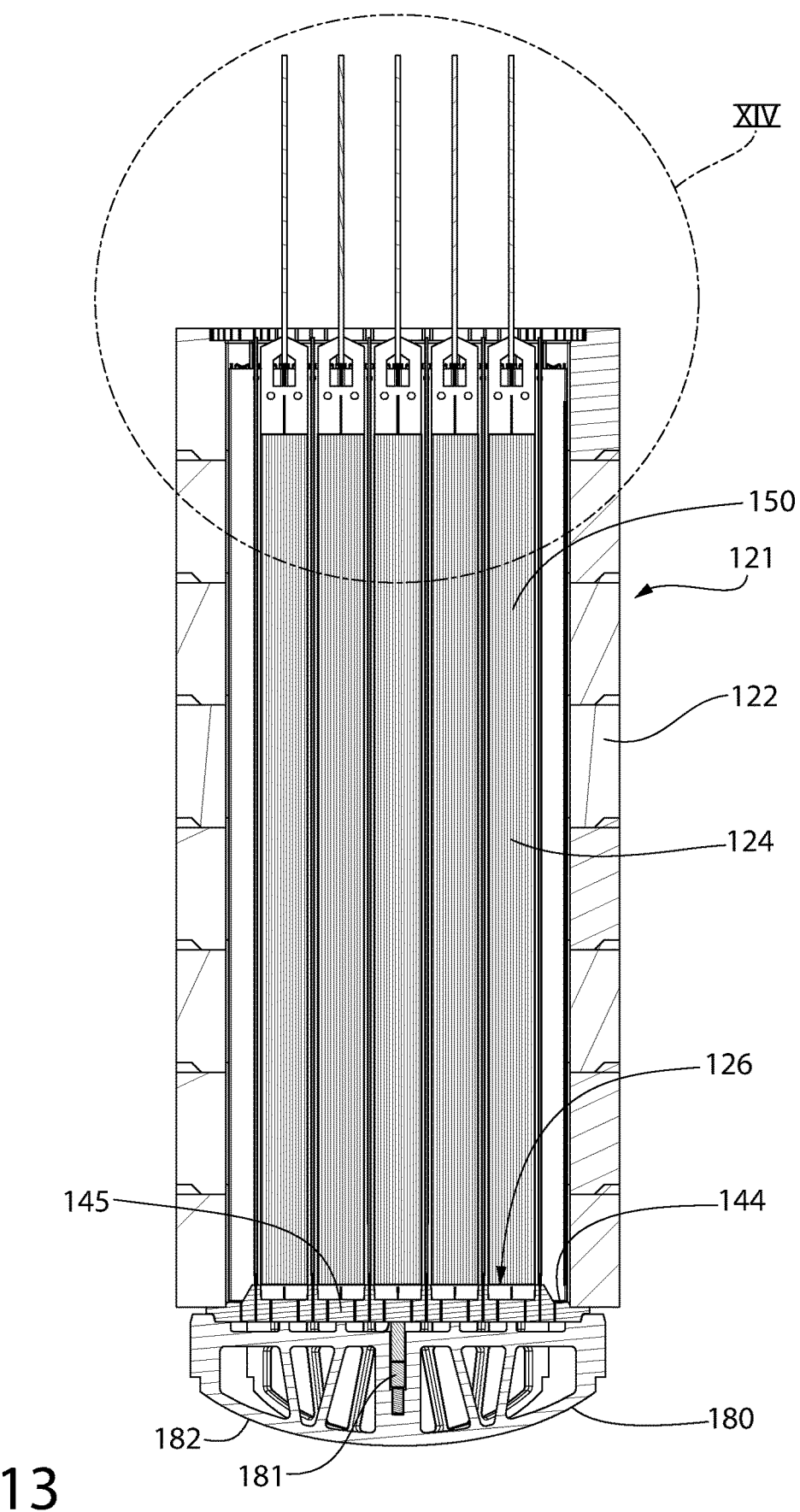
FIG. 13 is a side cross-sectional view of the fuel core of FIG. 11.
Figure 14:
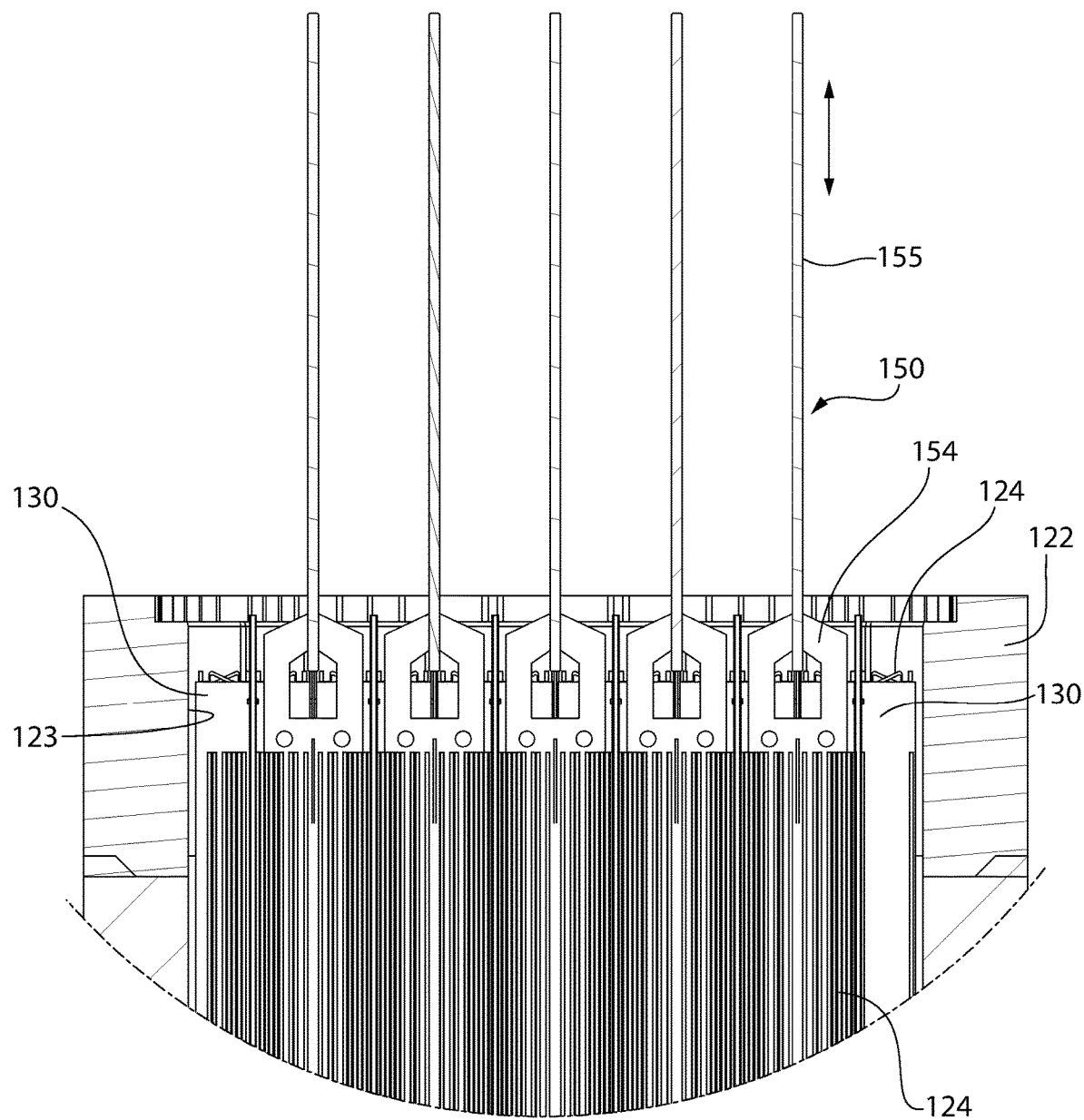
FIG. 14 is a close-up view taken from FIG. 13.
Figure 15:
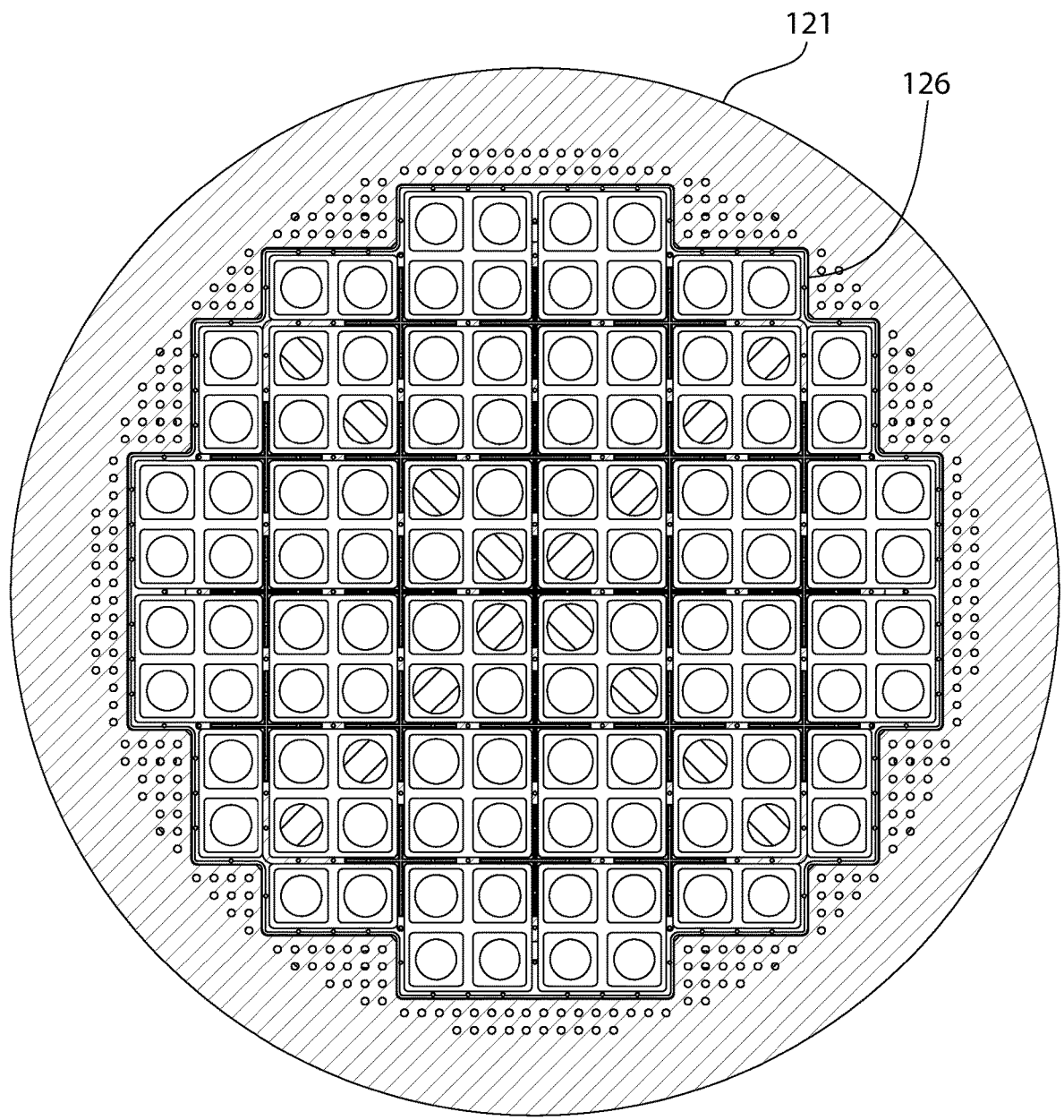
FIG. 15 is a transverse cross-sectional view taken from FIG. 7.

As shown in FIG. 4, reflector 121 may be machined, cast, or otherwise formed to create a polygonal-shaped multiple stepped interior wall surface 200 configured to engage complementary configured keying structures of the upper and lower core plates 125 and 126 when attached to the reflector. This rotationally locks the core plates 125, 126 in position relative to the reflector, as further described herein. The connecting rods 176 noted above ensures that the stepped facets or surfaces of each reflector ring segment 122 are properly aligned with each other in adjoining segments in the vertical stack.

Figure 31:
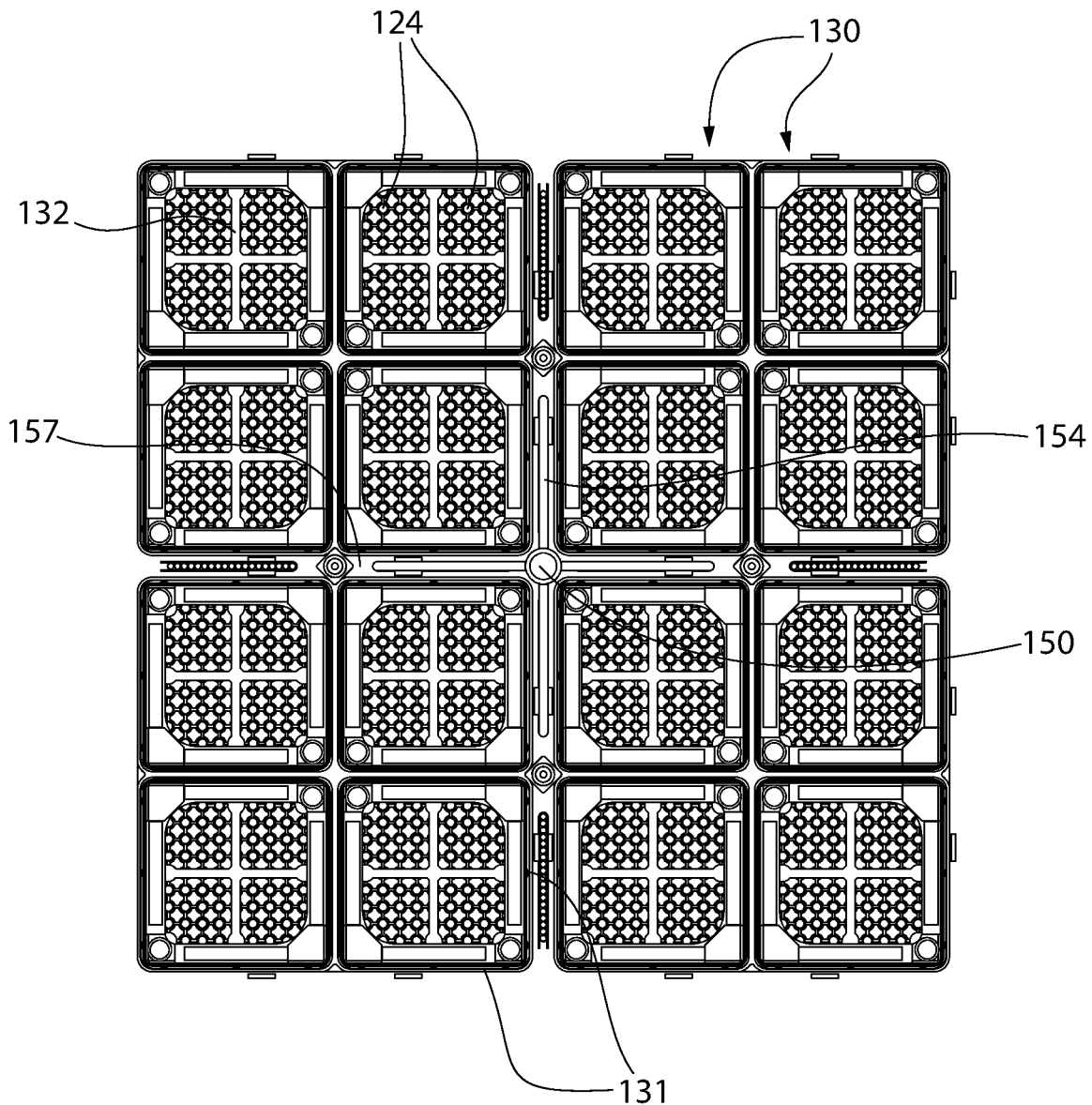
FIG. 31 is a top plan view thereof.
Figure 32:
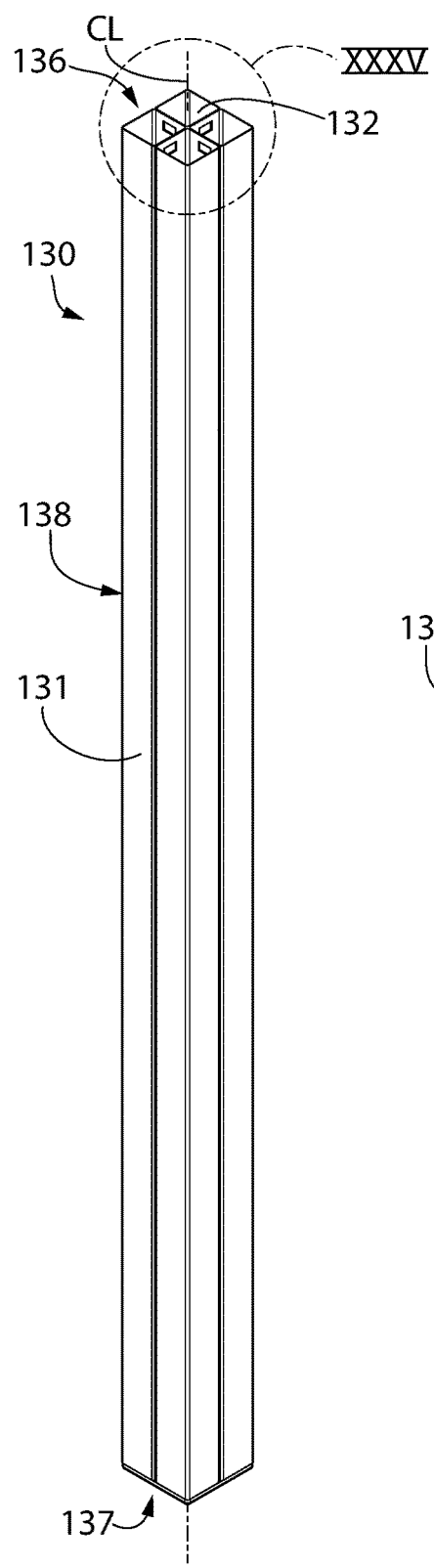
FIG. 32 is top perspective view of one embodiment of a single channel box of square cross-sectional shape configured for holding multiple fuel assemblies (four in this example)
Figure 33:
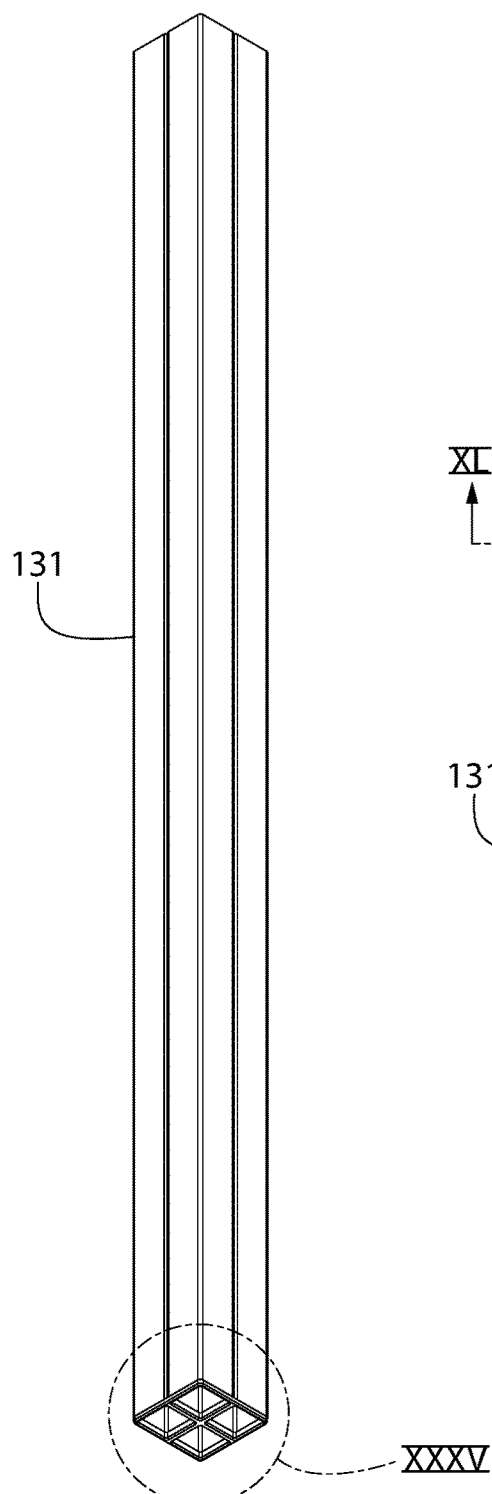
FIG. 33 is a bottom perspective view thereof.
Figure 34:
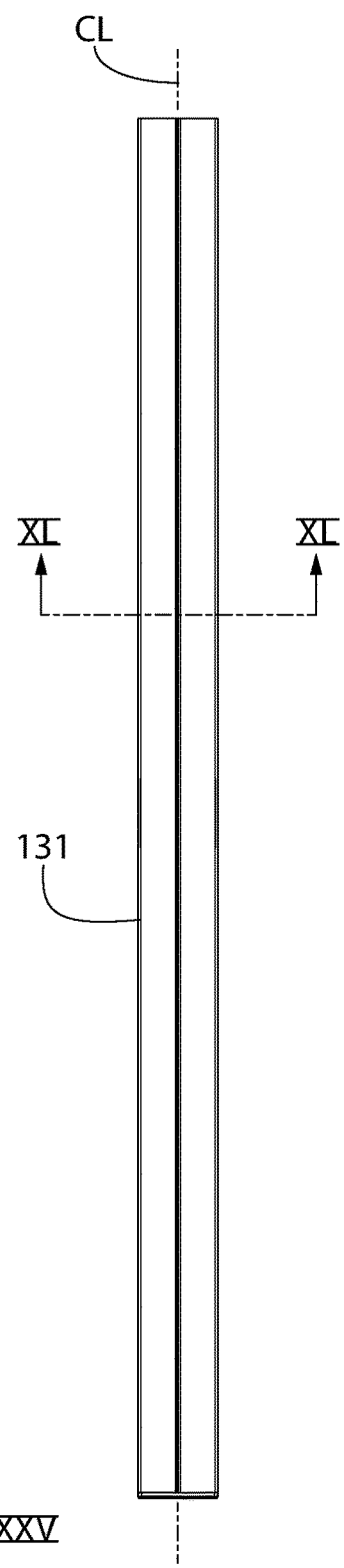
FIG. 34 is a side view thereof.
Figure 35:
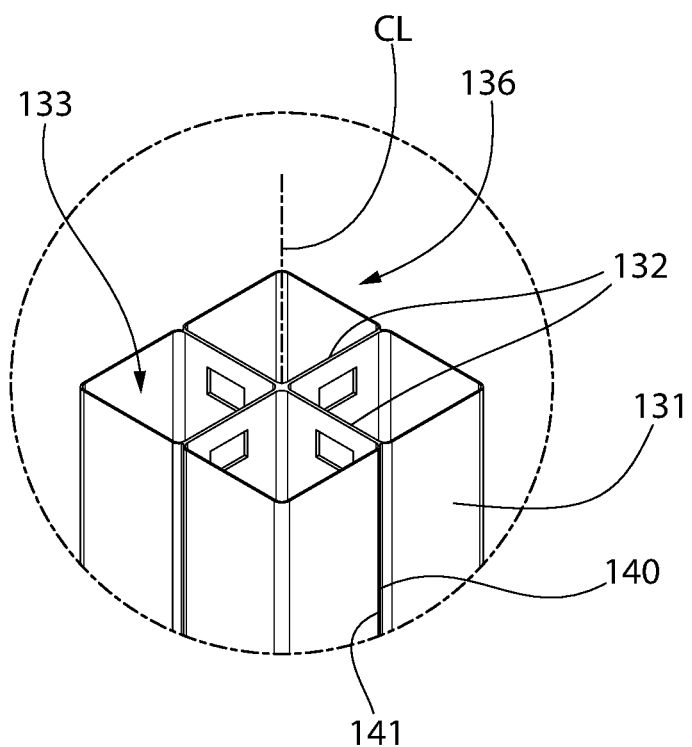
FIG. 35 is a top close-up view taken from FIG. 32.

The fuel core 120 further includes a lower core plate 126 and a plurality of vertically elongated channel boxes 130 supported by the lower core plate. When the upper internals unit 110 is placed on top of the fuel core 120 in the reactor vessel 100, the channel boxes 130 will extend vertically between the upper and lower core plates 125, 126. The channel boxes 130 each provide a flow conduit or channel for flow of primary coolant through the fuel assemblies 124 disposed in the boxes. As shown in FIGS. 30 and 31 particularly, each channel box 130 is transversely/laterally separated from adjacent channel boxes by peripheral water gaps 157 which are filled by primary coolant during normal operation of the reactor.

Referring now generally to FIGS. 26-42, the channel boxes 130 may each define a vertical centerline CL and have a generally rectangular prismatic or cuboid configuration in one embodiment as illustrated. Channel boxes 130 are longitudinally and vertically elongated structures each including a top end 136 and bottom end 137, and plurality of sidewalls 138 extending between the ends. Bottom end 137 may includes a base reinforcement 137a for abutting engaging the lower core plate 126 when inserted in the core to prevent damage to the channel box 130. Channel boxes 130 may have a height that extends for a majority of, and in some embodiments as shown substantially the entire height of the cylindrical reflector 121. Each channel box 130 in one embodiment is formed by a plurality of perpendicularly intersecting outer walls 131 and inner walls 132 collectively defining a plurality of vertical longitudinally-extending interior open channels or cells 133 configured for holding a fuel assembly 124. Each cell 133 has a transverse cross sectional area configured for receiving and holding no more than a single or solitary nuclear fuel assembly 124 which may have a square cross-sectional shape in the non-limiting illustrated embodiments. The outer walls 131 may thus be arranged perpendicularly to each other and define a perimeter of each box. The inner walls 132 may also be disposed perpendicularly to each other and intersect at right angles to form a cruciform configuration (in transverse cross-sectional view) as shown.

In one embodiment, the array of channel boxes 130 provided may include a combination of boxes having either a square or a rectangular transverse cross section in shape for placement in different regions of the fuel core 120. The square channel boxes (see, e.g. FIGS. 32-41) have four cells 133 with cruciform inner walls 132 and may comprise a majority of the number of boxes positioned in both the inboard and portions of the peripheral or outboard regions of the fuel core. The rectangular channel boxes (see, e.g. FIG. 42) have two cells 133 with a single straight inner wall 132 and may be selectively positioned in certain outboard regions of the fuel core to advantageously maximize the number of fuel assemblies 124 than can be packed into the core.

Figure 36:
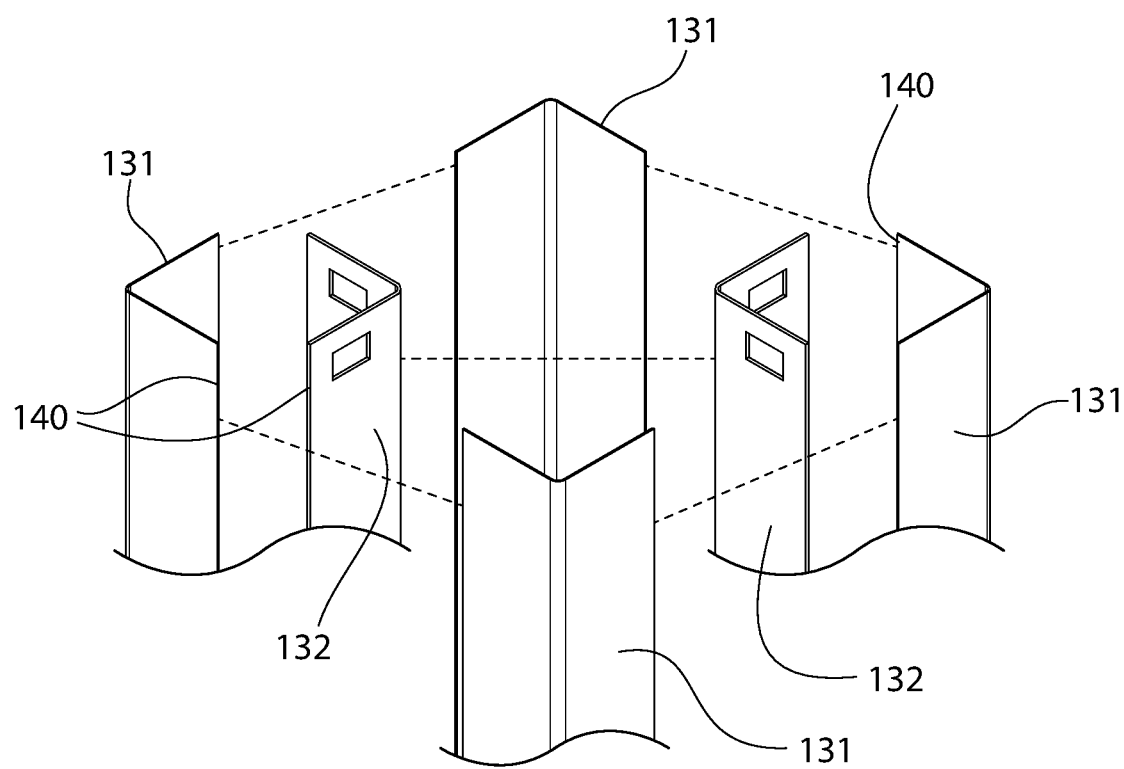
FIG. 36 is an exploded view of the channel box showing an exemplary embodiment of one construction of the box.
Figure 37:
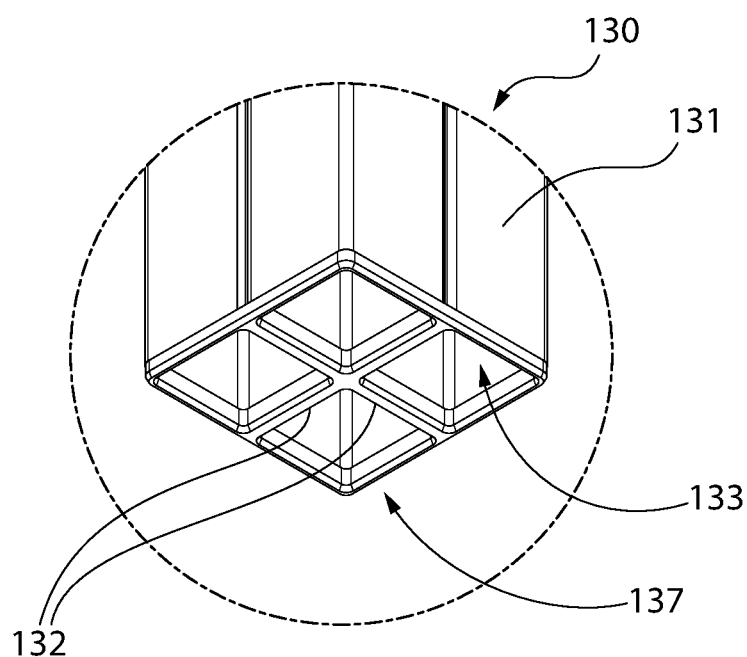
FIG. 37 is a bottom close-up view taken from FIG. 33.
Figure 38:
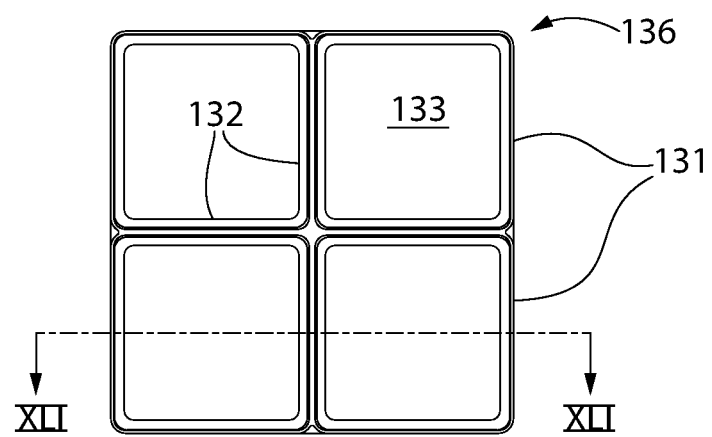
FIG. 38 is top plan view of the channel box.
Figure 39:
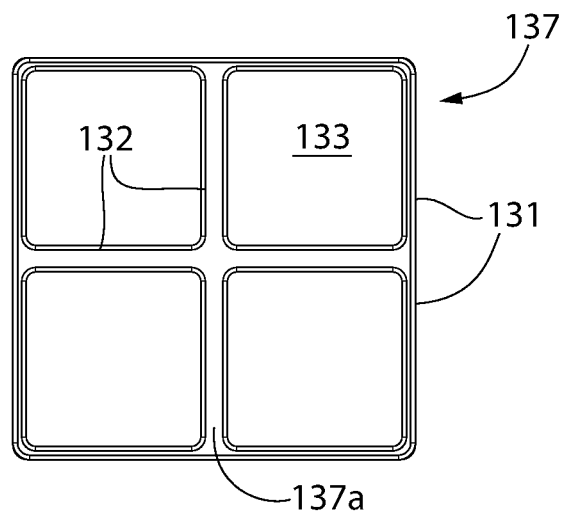
FIG. 39 is a bottom plan view thereof.
Figure 40:
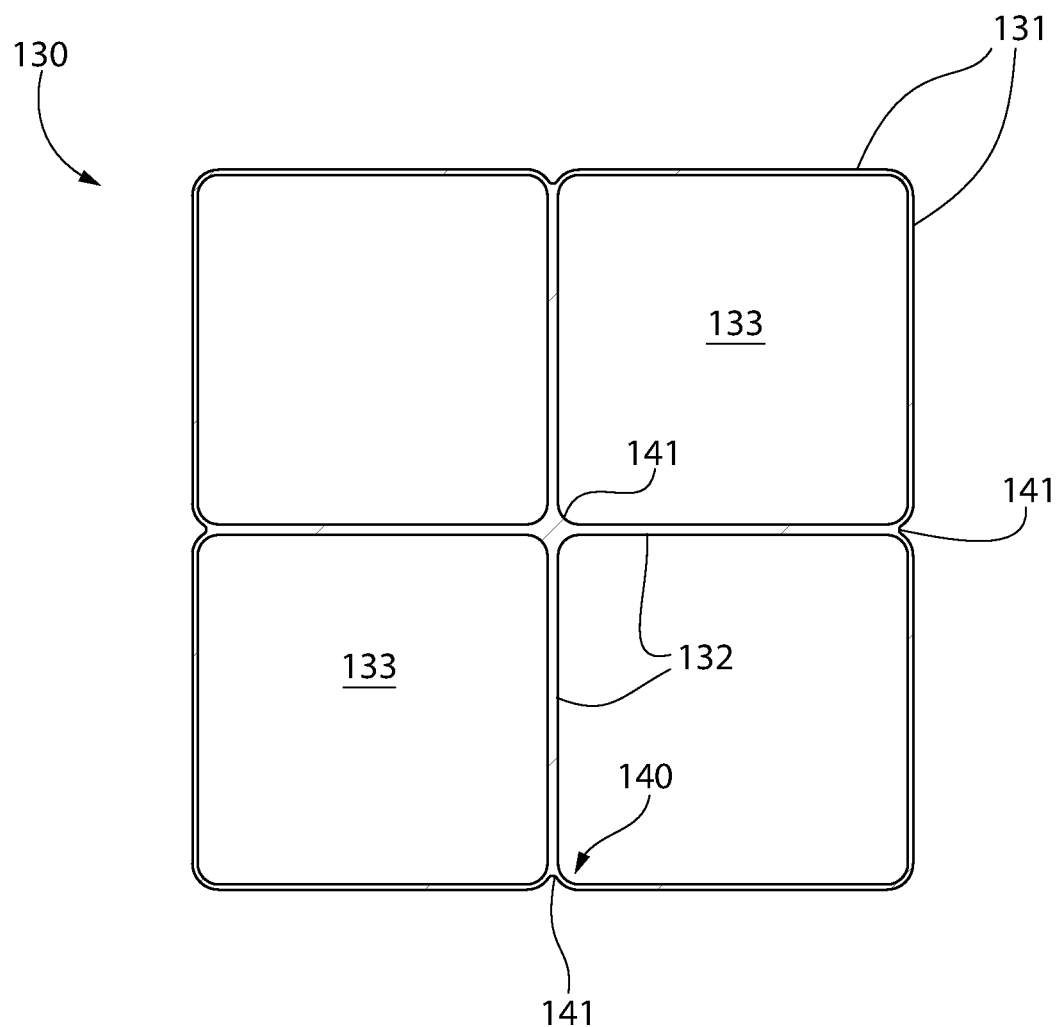
FIG. 40 is a transverse cross-sectional of the channel box taken from FIG. 34.
Figure 41:
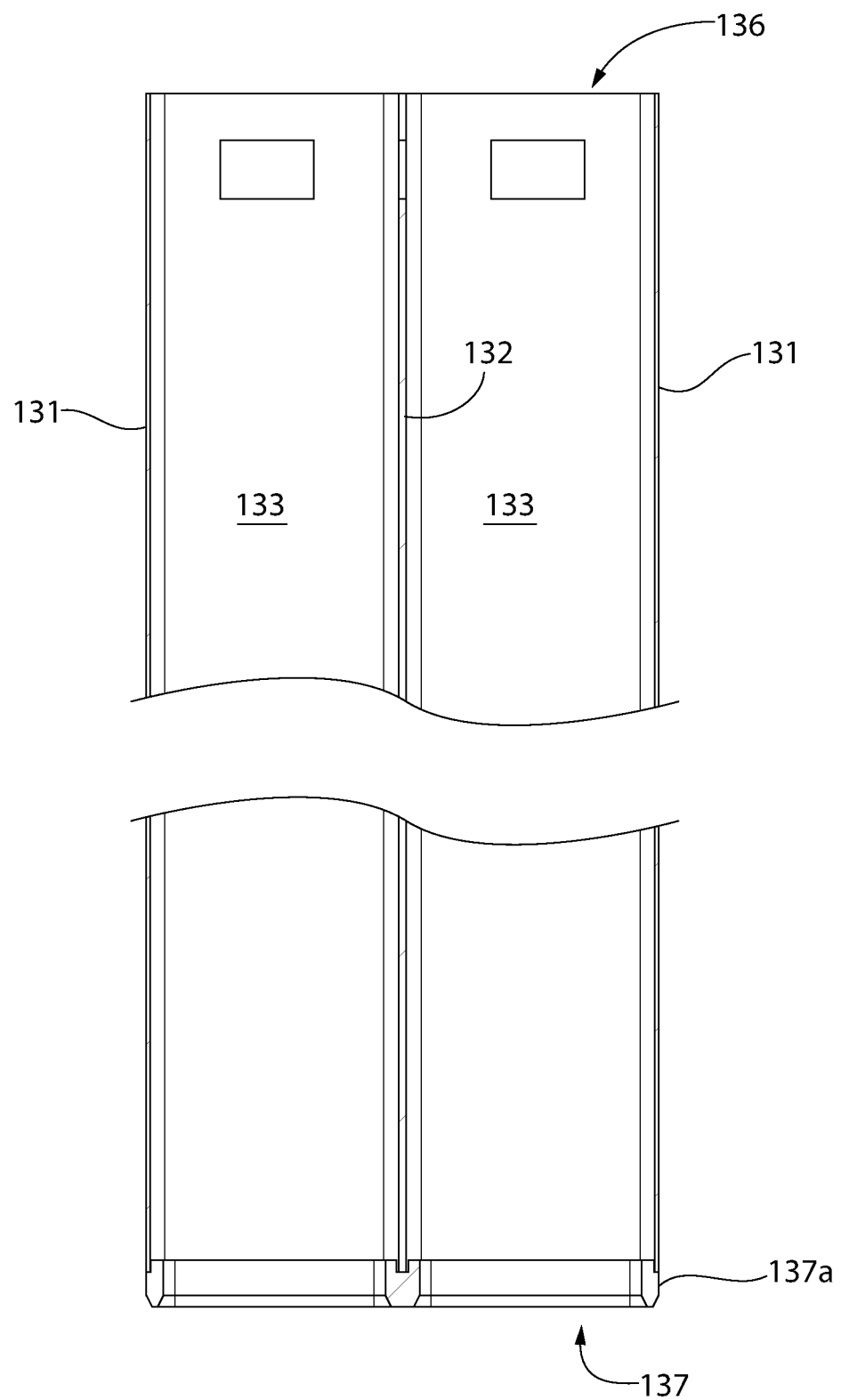
FIG. 41 is a longitudinal cross-sectional view of the channel box taken from FIG. 38.
Figure 42:
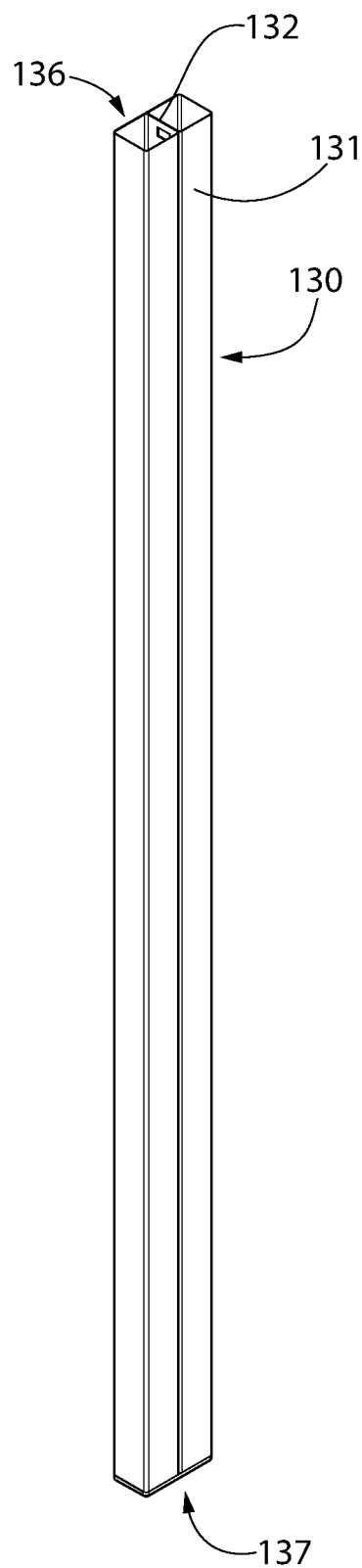
FIG. 42 is a perspective view of a second channel box of rectangular cross-sectional shape usable in the fuel core.

In one exemplary construction, the outer and inner walls 131, 132 of the channel boxes 130 may be formed by a combination of longitudinal structural metal plates which are assembled and welded together along their abutting longitudinal edges 140 to form the integral welded structures depicted in the figures which have substantial strength and stiffness resistance to bowing or bending normal to the vertical centerline of the boxes. FIG. 36 is an exploded view of the plates in one representative assembly of a square channel box 130. In this embodiment, the square channel box 130 may be formed by four L-shaped exterior wall plates of single thickness welded together by longitudinally-extending welds 141 along their mating longitudinal edges 140 to form the outer walls 131 creating the channel box's perimeter. The inner walls 132 may be formed by two L-shaped interior wall plates of single thickness placed back to back at their corner which may be welded together to create a cruciform structure with perpendicularly intersecting walls. In one construction, the free longitudinal edges of the interior wall plates may each be welded to and at the intersection of abutted mating longitudinal edges 140 of two exterior wall plates. The interior wall plates of the inner walls 132 therefore intersect the outer walls 131 perpendicularly at right angles.

It bears noting that the inner walls 132 formed by the L-shaped interior wall plates form a cruciform shaped internal lateral bracing (in transverse cross section) for each channel box 130. This structurally reinforces the channel box 130 which creates a robust construction that resists radiation induced bowing and bending forces acting in a plane transverse to the vertical centerline CL of the channel box (and longitudinal axis of the fuel core 120). This is a common problem with fuel assembly box structures used in BWR reactors which have completely open center regions that lack such interior walls or bracing and subsequently cannot effectively resist radiation bowing which adversely prevents proper and complete insertion of the control rods in the fuel core over time. The structurally reinforced channel boxes 130 disclosed herein represent an advance over such unbraced prior channel box fuel assembly support structures.

In addition, it bears noting that the close-packed nature of the four fuel assemblies contained within one channel box 130, contrary to currently operating boiling water reactors (BWRs) which have each individual assembly surrounded by its own channel box, provides increased operational safety for the conditions found in the present small modular reactor (i.e. natural circulation primary coolant with a relatively low inlet temperature) by reducing the moderator-to-fuel ratio.

The foregoing construction of the channel boxes and arrangement of interior cells 133 benefits the neutronics of the nuclear reactor by eliminating water gaps between fuel assemblies 124 contained in the cells. Each interior cells shares a common inner wall 132 with at least one other cell and is separate therefrom by the single thickness of the common inner wall. No open gaps or double walls are formed between cells 133 in one embodiment.

In one embodiment, the channel boxes 130 may be constructed of a zirconium-based metal alloy. Other suitable metallic materials however may be used.

The lower core plate 126 is coupled to the bottom of the cylindrical reflector 121. Referring now to FIGS. 15-19, the lower plate core plate 126 includes a top 151 and bottom 152 defining upward and downward facing surfaces. Lower core plate 126 generally comprises a substantially planar circular metallic body defining an array comprising a plurality of upwardly open receptacles 143 each complementary configured to and engaging a respective bottom end 137 of one of the channel boxes 130 for support. The receptacles 143 include a combination of square receptacles for receiving and engaging square channel boxes 130 and rectangular channel boxes for rectangular channel boxes. Each receptacle therefore has an upwardly facing support surface having a complementary configuration to the bottom end surface of the channel box 130 to be received therein. Accordingly, each receptacle comprises either a cruciform support surface 148 (for square channel boxes) which engages a complementary configured cruciform bottom end surface portion of the channel box, or linear support surface 149 (for rectangular channel boxes) which engages a linear bottom end surface portion of the channel box. The support surfaces 148 and 149 are defined by the tops of recessed vertical divisional walls 153 within each receptacle 143 formed by the structural body of the lower core plate 126. When the bottom ends 137 of the channel boxes 130 are engaged with the receptacles and support surfaces, the division walls 153 fluidly separate the flow of primary coolant upwards through the open cells 133 of each channel box 130 to avoid or minimize any cross flow into adjacent cells. The division walls 153 therefore define a plurality of sub-cells 177 within each receptacle 143 (four within a square receptacle and two within a rectangular receptacle as shown).

Figure 3:
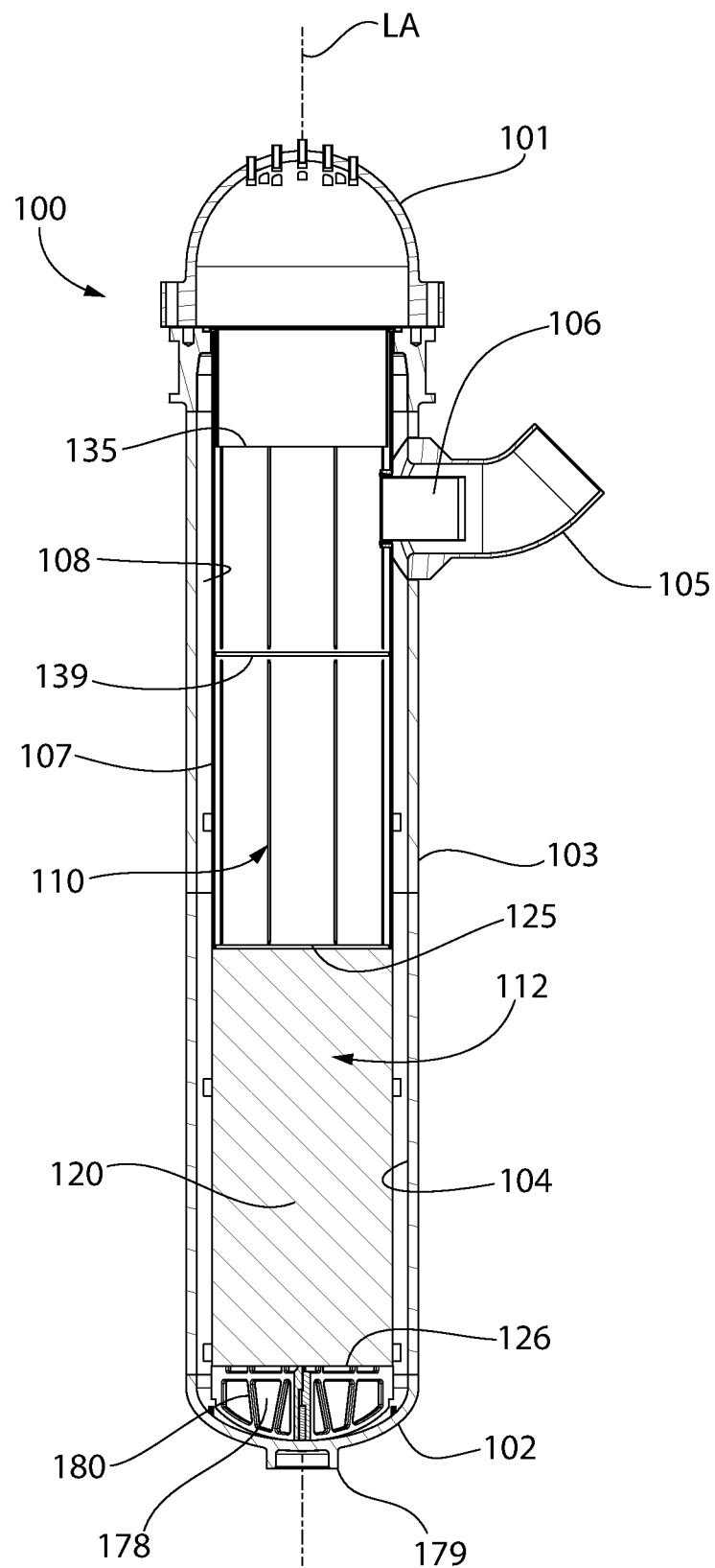
FIG. 3 is a longitudinal cross-sectional view thereof showing an upper internals unit and a lower internals unit (fuel core) of the reactor in the reactor vessel.

Lower core plate 126 includes a plurality of flow orifices 146 which are in fluid communication with the bottom flow plenum 178 formed beneath the lower core plate in the reactor vessel 100 (see, e.g. FIG. 3). Each sub-cell 177 in the receptacles 143 of the lower core plate 126 has an associated flow orifice 146 which are in fluid communication with its respective channel box 130 and fuel assembly 124 therein. The square receptacles 143 may therefore have four orifices 146 and rectangular receptacles two orifices. The flow orifices 126 have diameters selected to produce the desired primary coolant flow rate through each channel box 130 and fuel assembly 124.

The lower core plate 126 further comprises a plurality of upstanding guide walls 145 arranged in a perpendicularly intersecting array as shown. The guide walls 145 slideably engage and guide the bottom ends 137 of the channel boxes 130 into the upwardly open receptacles 143 of the lower core plate 126 when the channel boxes are initially inserted into the fuel core 120. In addition, the guide walls 145 further act to help isolate and separate the flow from the receptacles 143 in the lower core plate 126 into the channel boxes 130 to minimize possible cross flow.

In some embodiments, lower core plate 126 may further include a polygonal-shaped and raised annular anti-rotation lip 144 protruding upwards from a top surface of the lower core plate. The anti-rotation lip 144 extends circumferentially around a peripheral portion of the lower core plate as shown. The anti-rotation lip 144 may have a multiple stepped configuration which matches and engages the complementary configured multiple stepped interior surface 200 of the cylindrical reflector 121 in a similar manner to the upper core plate 125 to operably key and lock the lower core plate 126 in rotational position relative to the cylindrical reflector. When the lower core plate 126 is engaged with cylindrical reflector 121, the anti-rotation lip 144 is inserted inside a bottom end of the cylindrical reflector and peripheral portions of the circular flat body of the lower core plate outboard of the anti-rotation lip engage a downward facing bottom end surface of the cylindrical reflector (see, e.g. FIG. 8). A stepped shoulder structure is therefore formed between the protruding anti-rotation lip 144 and adjoining upward facing flat top surface of the lower core plate 126. It bears noting that the guide walls 145 may have a greater height than the anti-rotation lip 144 and are arranged to avoid engaging the reflector 121.

Figure 16:
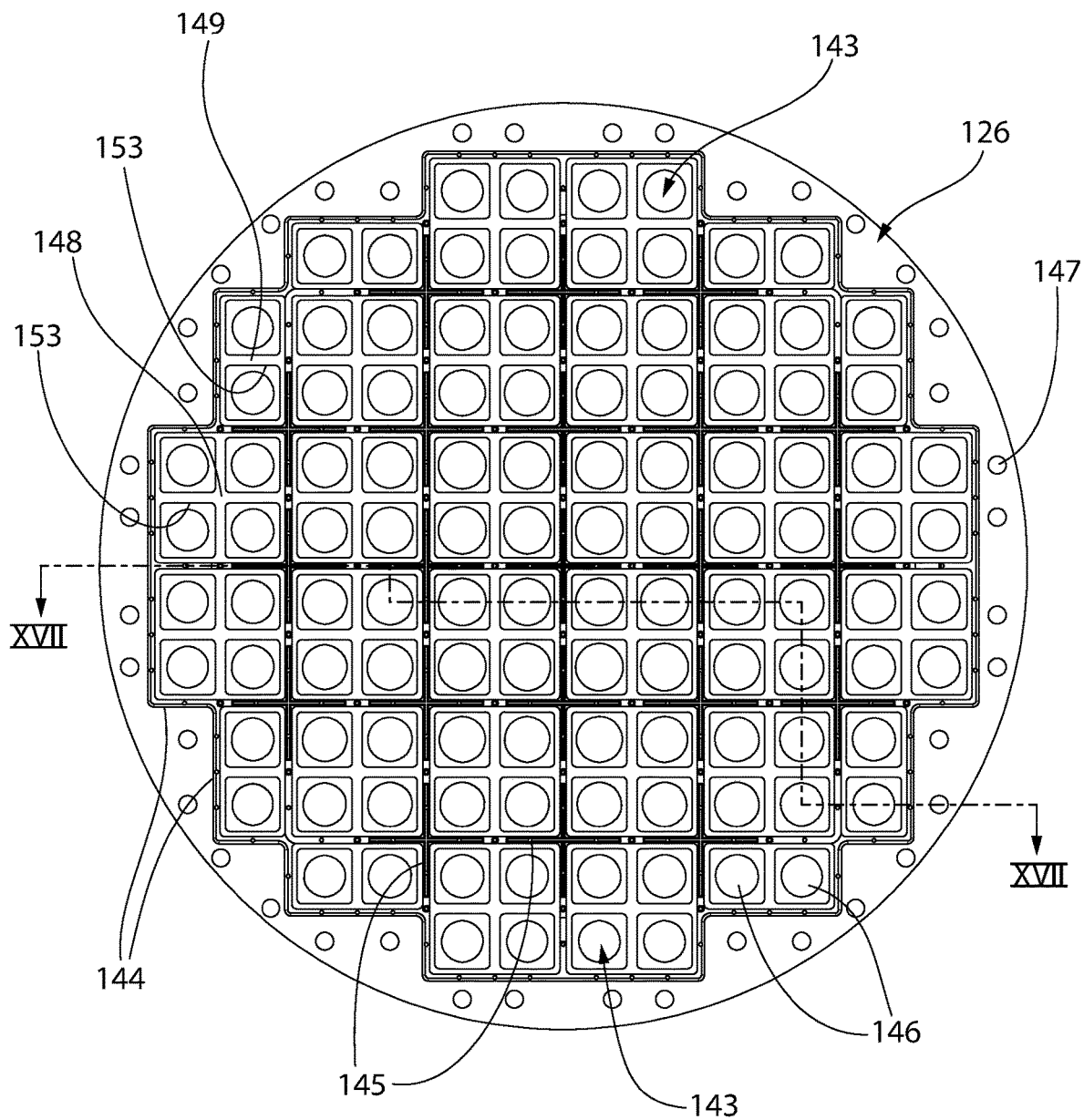
FIG. 16 is a top plan view of the lower core plate of the fuel core.
Figure 17:
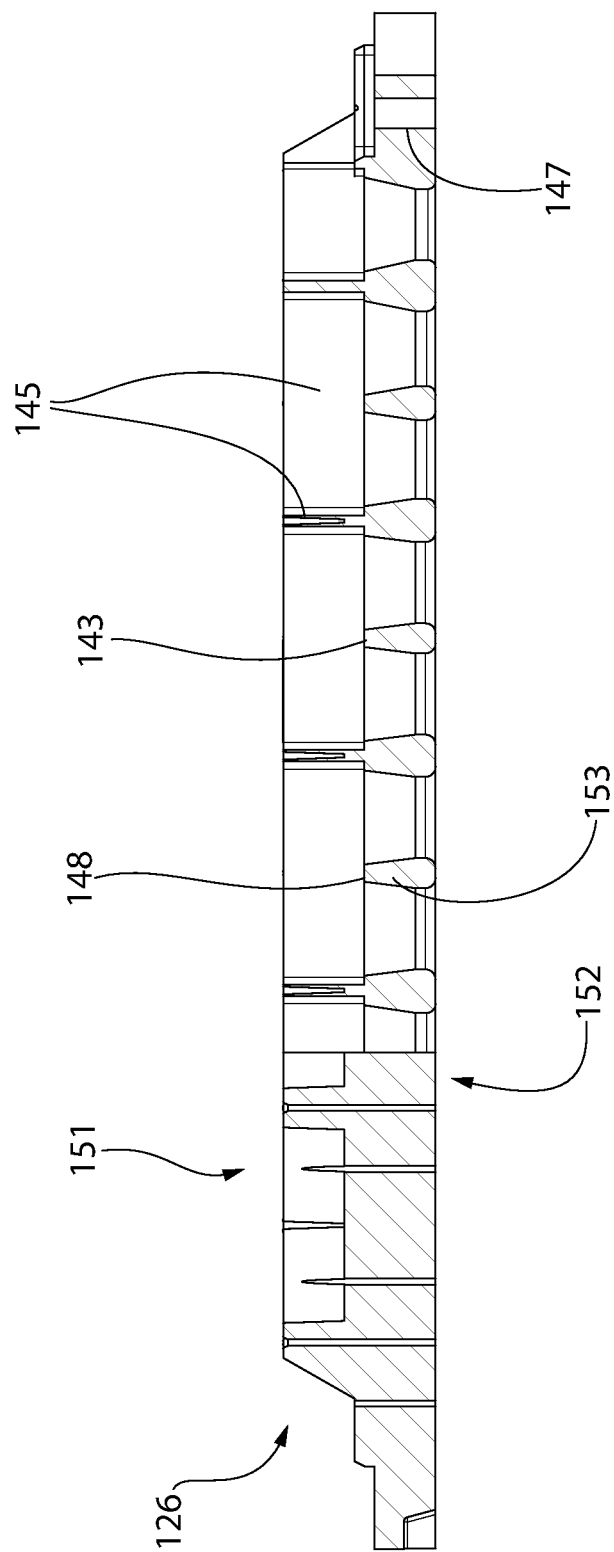
FIG. 17 is a cross-sectional view thereof taken from FIG. 16.
Figure 18:
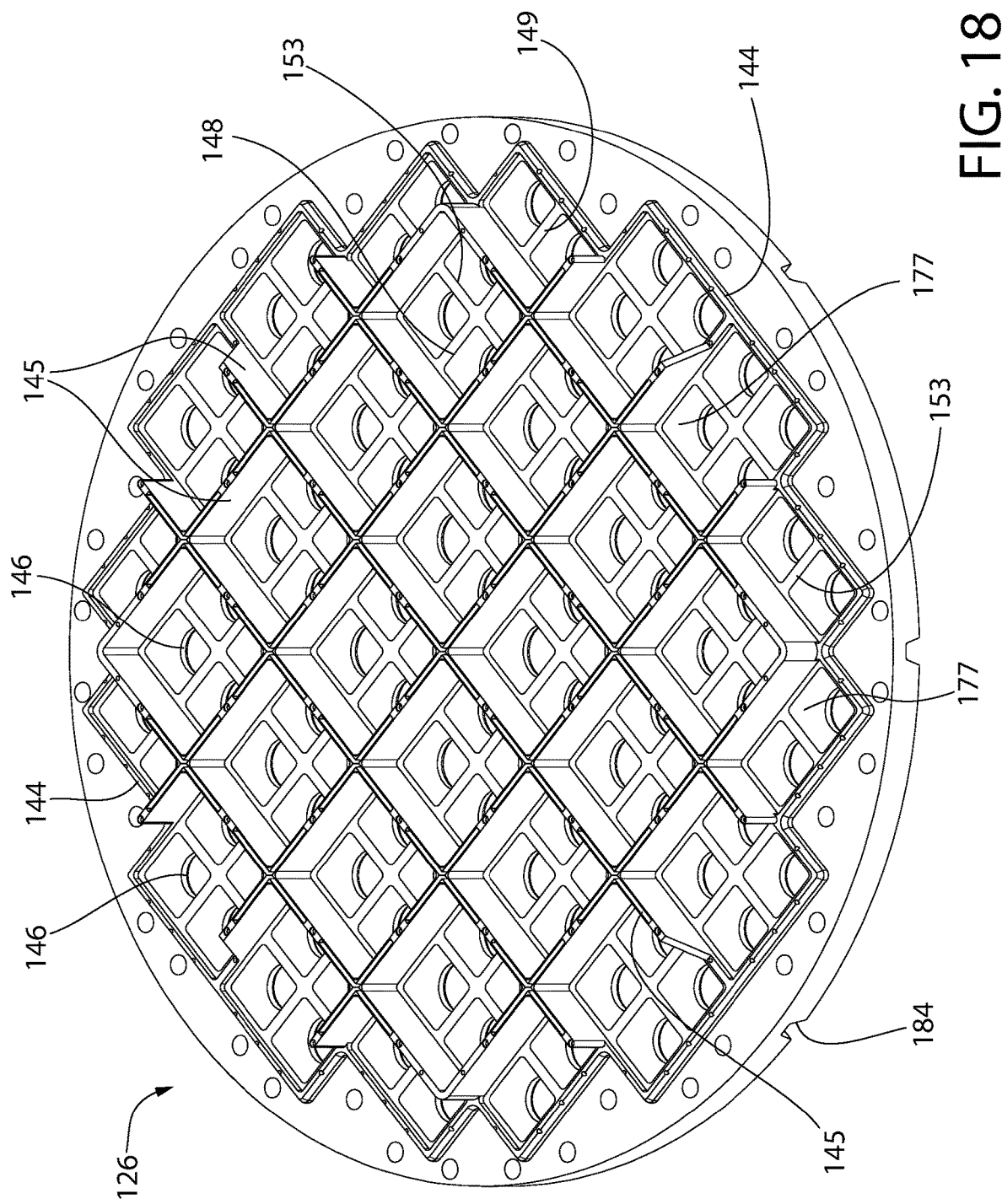
FIG. 18 is a top perspective view thereof.
Figure 19:
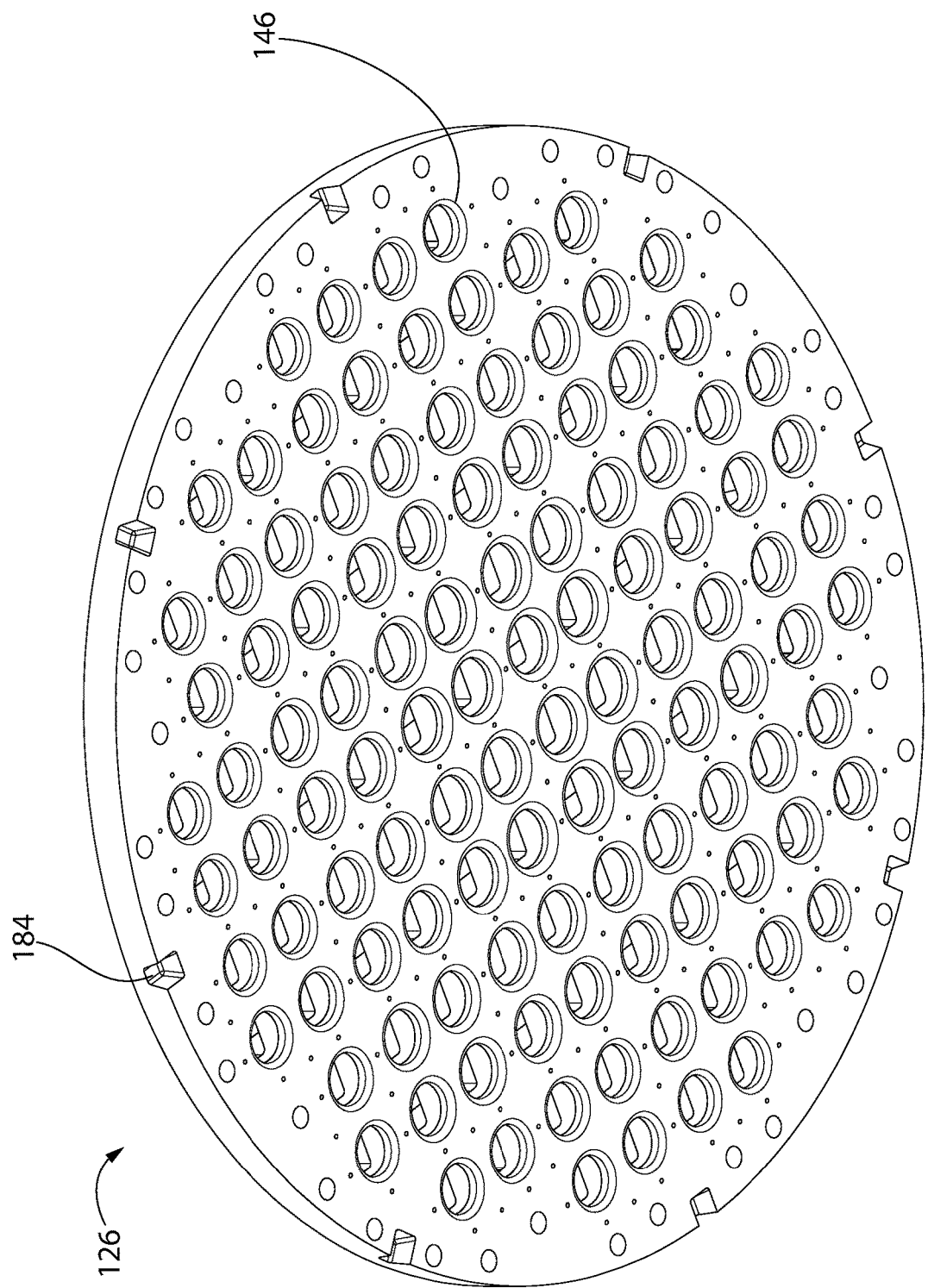
FIG. 19 is a bottom perspective view.
Figure 20:
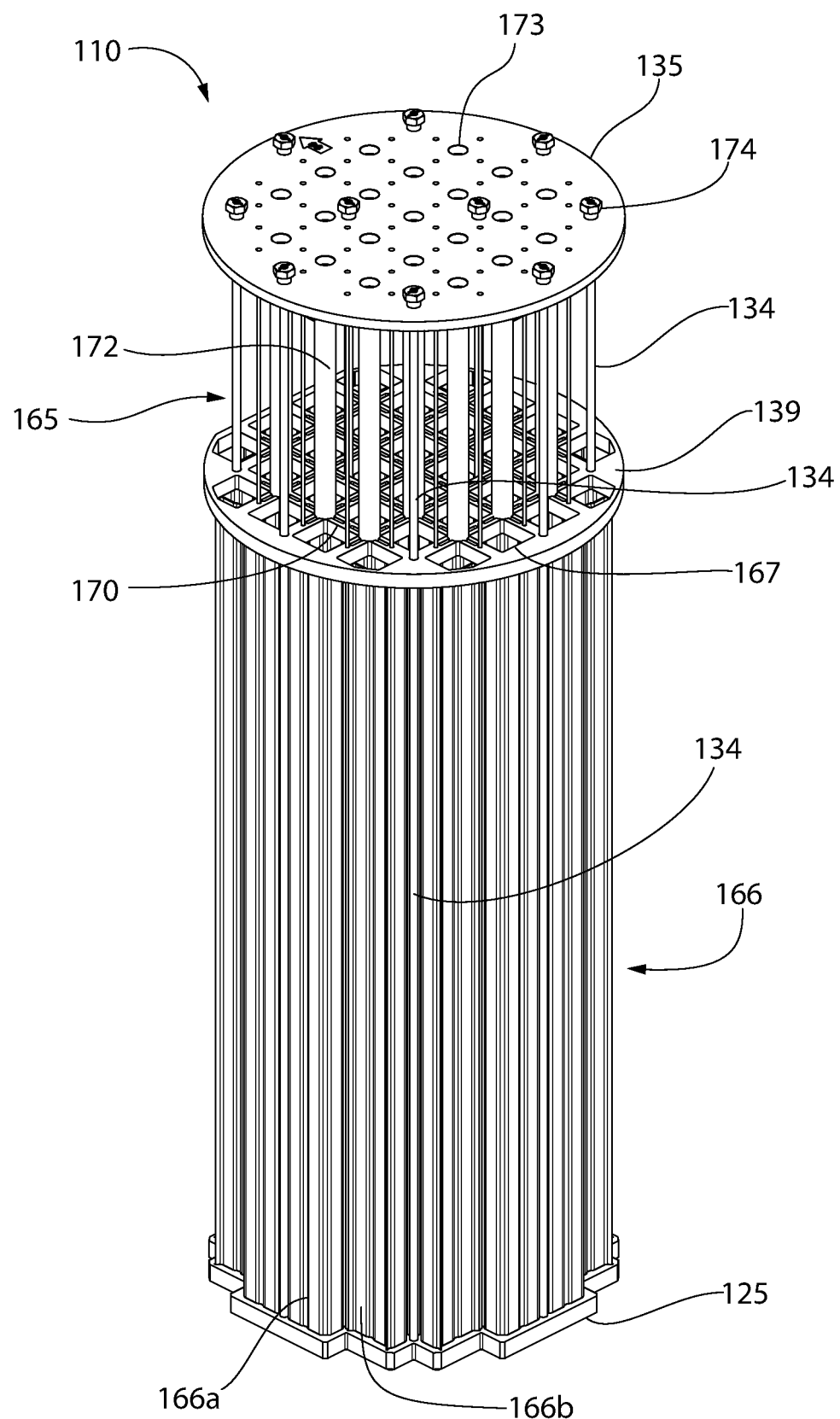
FIG. 20 is a top perspective view of the upper internals unit of the reactor vessel.
Figure 21:
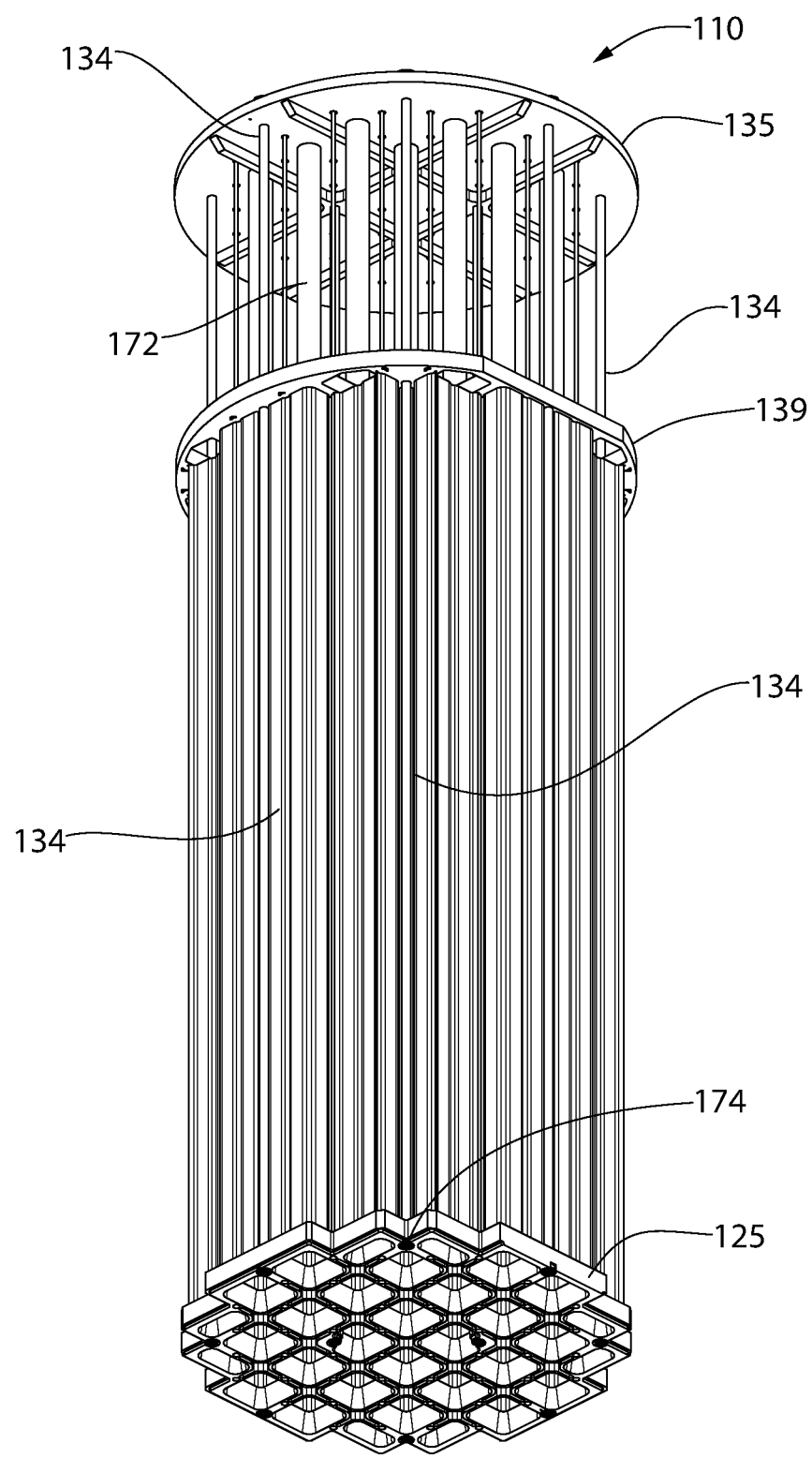
FIG. 21 is a bottom perspective view thereof.
Figure 22:
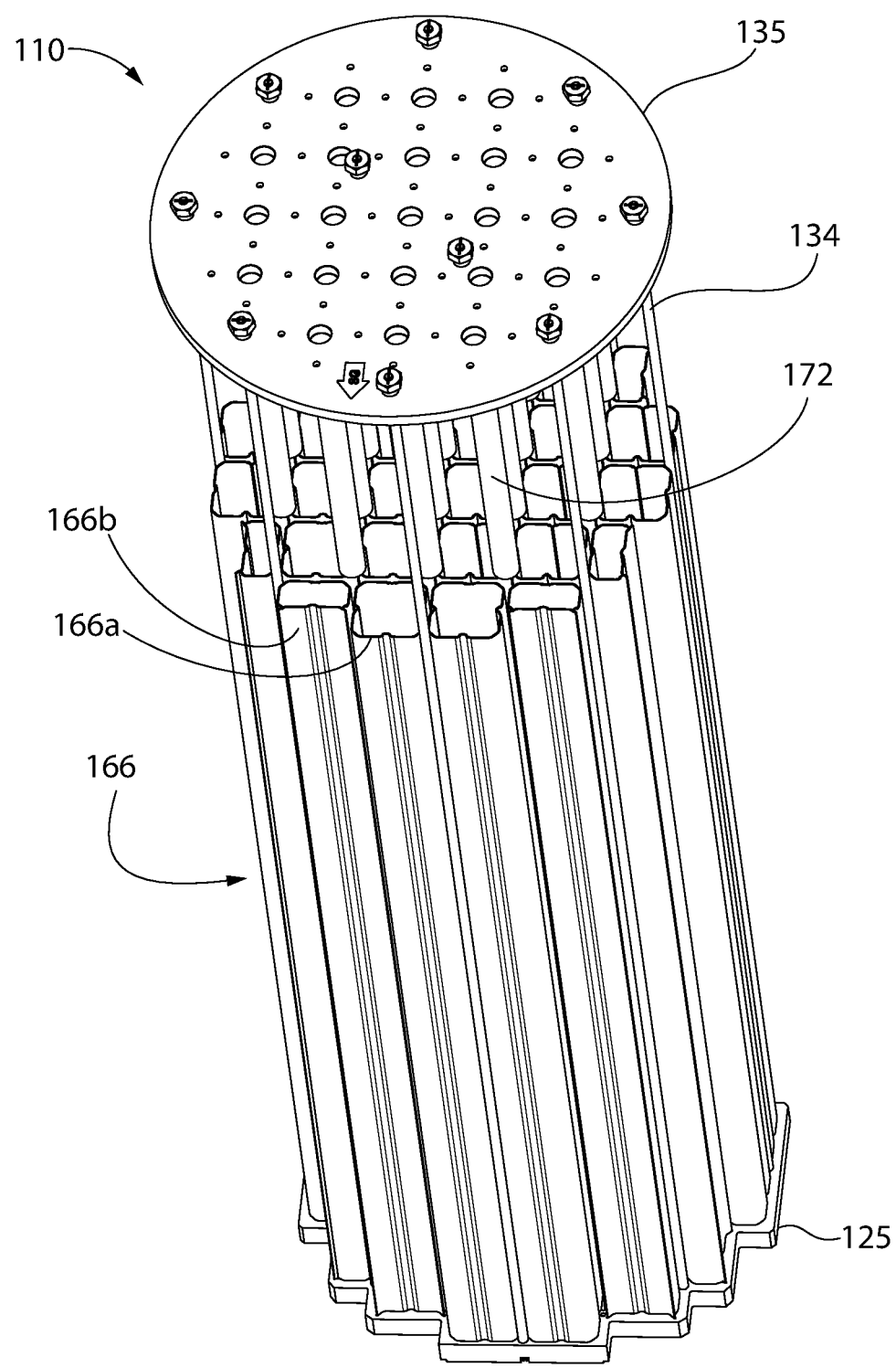
FIG. 22 is a top perspective view thereof with the intermediate support plate removed to reveal the open tops of the flow tubes of the upper internals unit.
Figure 23:
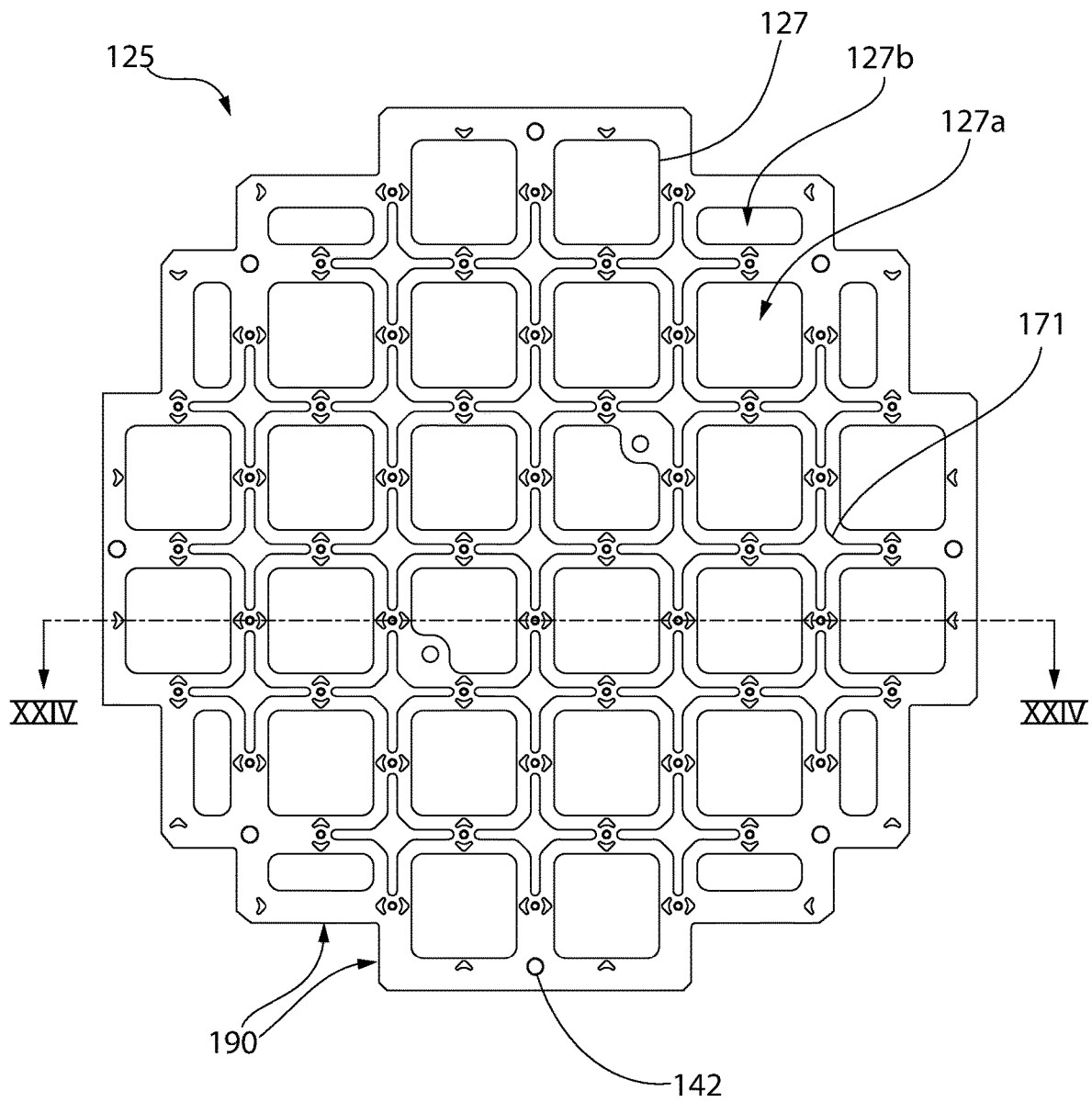
FIG. 23 is top plan view of the upper core plate of the upper internals unit which is disposed at the bottom of the flow tubes.
Figure 24:
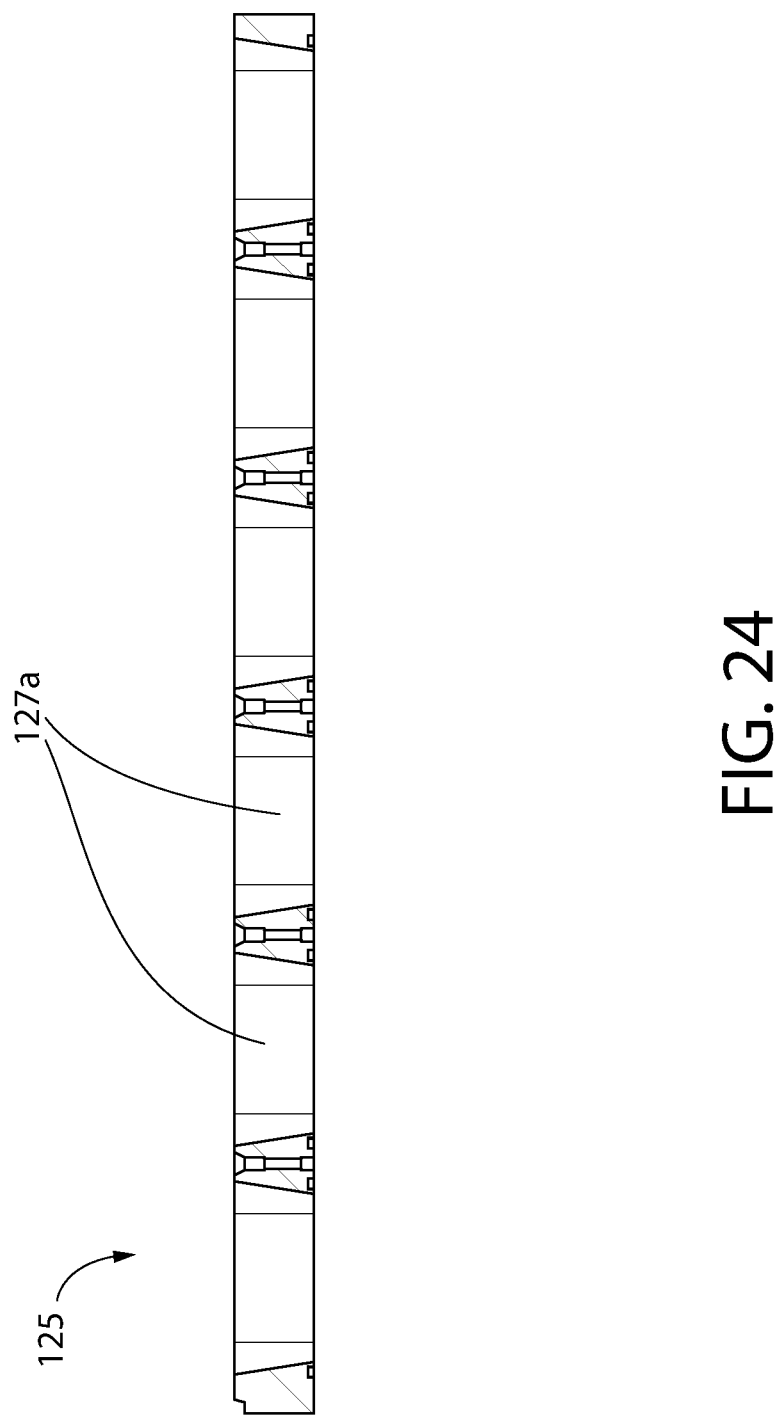
FIG. 24 is a side cross-sectional view thereof.
Figure 25:
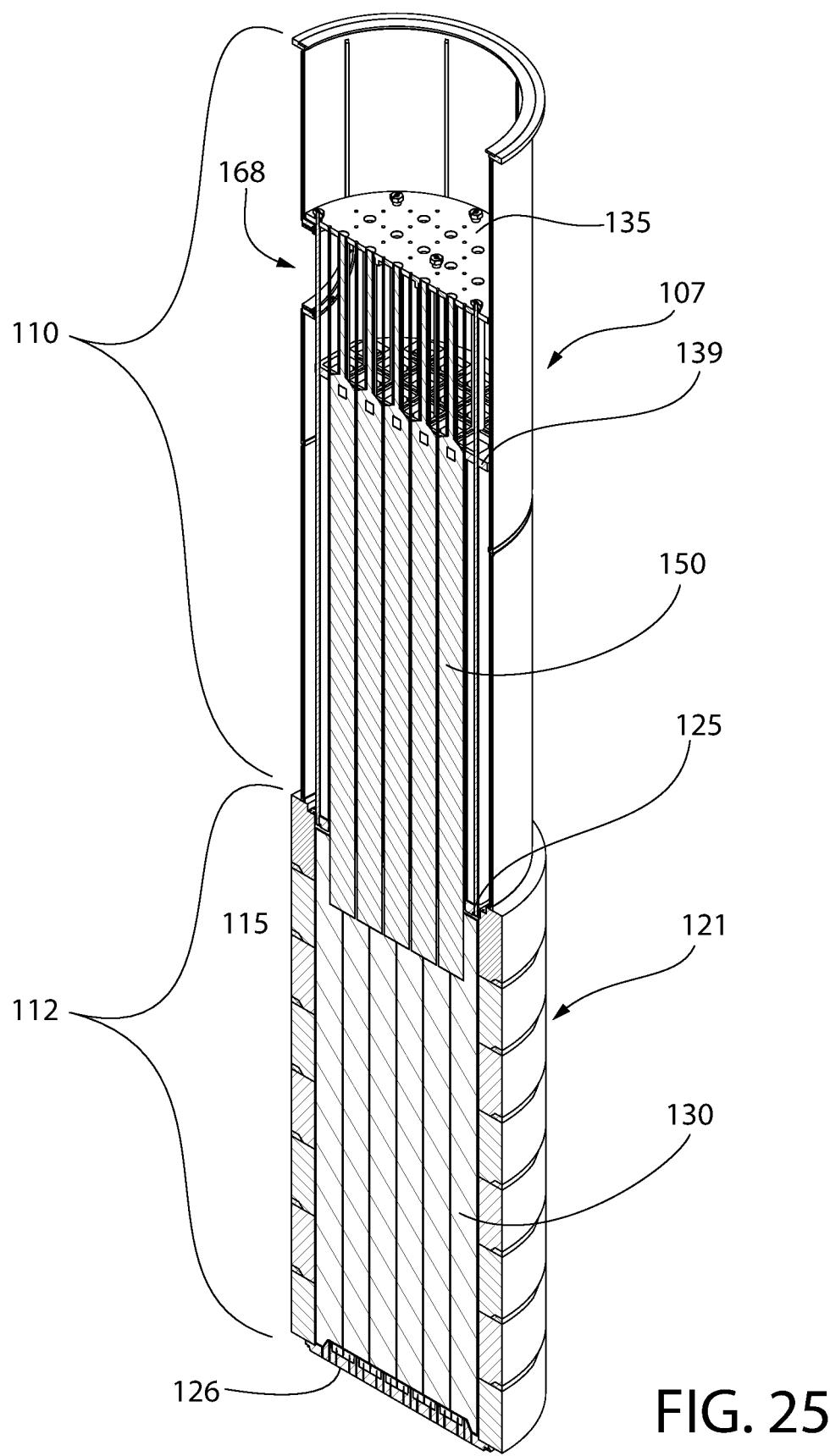
FIG. 25 is partial cross-sectional perspective view showing the assembled upper and lower internals unit (fuel core) and internal components of each.
Figure 26:
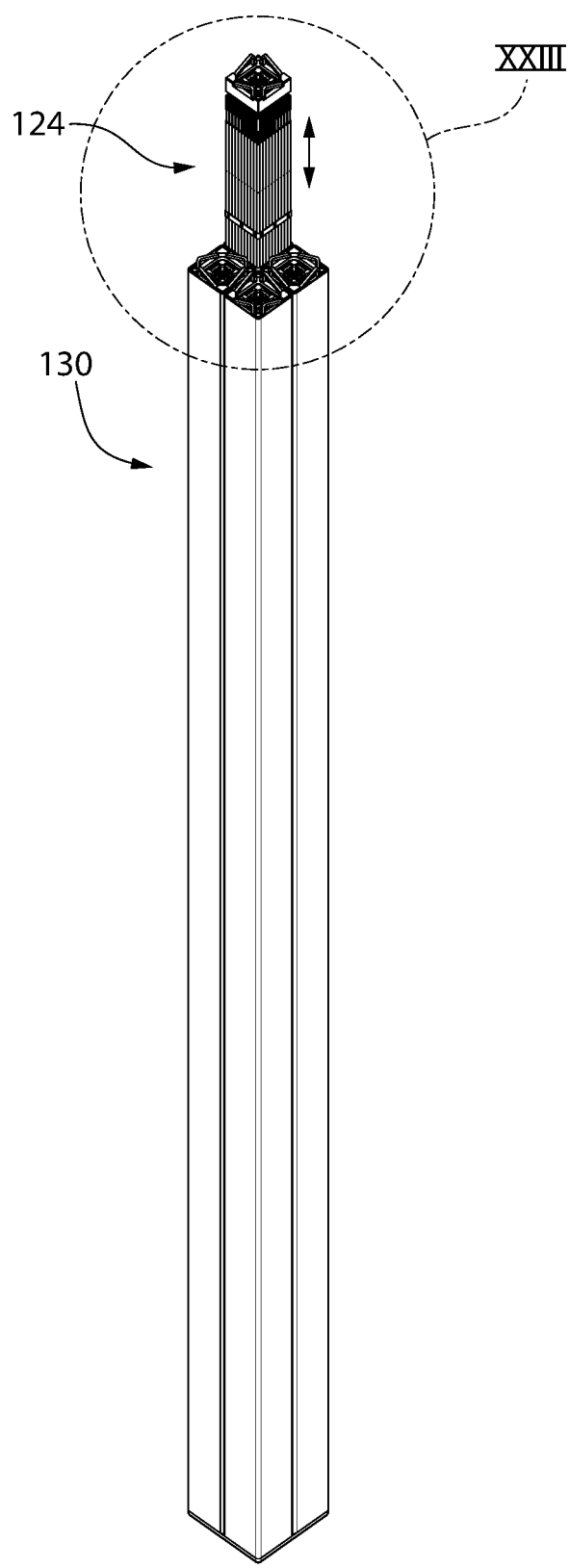
FIG. 26 is perspective view of a channel box of the lower internals unit (fuel core) with a fuel assembly partially inserted in one of the cells of the box.
Figure 27:
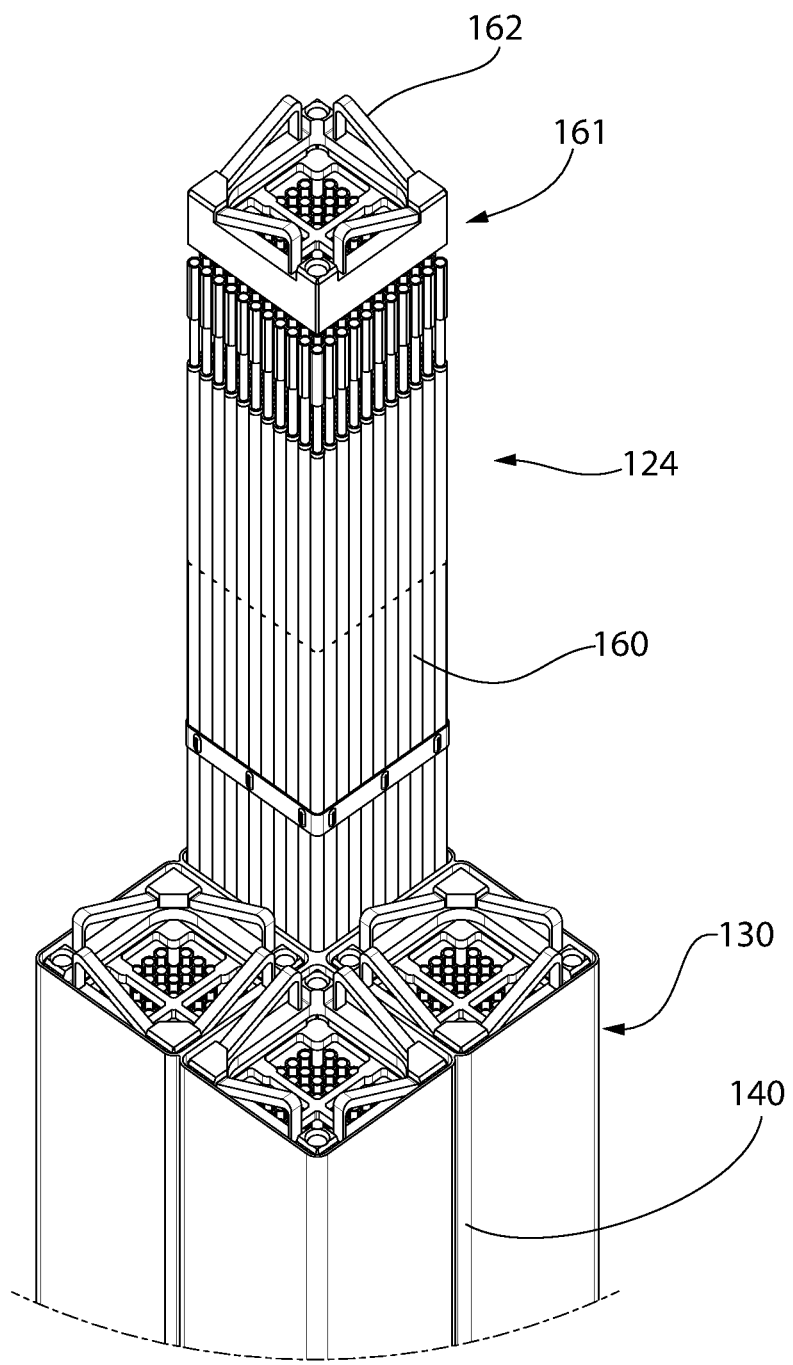
FIG. 27 is a close-up view taken from FIG. 26.

In some embodiments, the planar peripheral portions of the lower core plate 126 outboard of the raised anti-rotation lip 144 may include a plurality of through flow holes 147 (see, e.g. FIGS. 16 and 17). The flow holes 147 substantially line up vertically and axially up with the cooling conduits 139 in the cylindrical reflector. This allows primary coolant in the reactor vessel to circulate and flow through the lower core plate and reflector ring segments 122 to cool the reflector 121. Flow holes 147 are in fluid communication with the lower flow plenum 178 (see, e.g. FIG. 3).

In one embodiment, the metal upper and lower core plates 125, 126 may each be formed of a suitable corrosion resistant metal such stainless steel. Other metals may be used.

Referring to FIGS. 3-8 and 10, the lower core plate 126 and cylindrical reflector 121 are supported in the reactor vessel 100 by an open space frame type core support member 180 abuttingly engaging bottom surfaces of the cylindrical reflector and the lower core plate. Support member 180 may comprise a vertically-extending central hub 181 and plurality of arms 182 extending radially therefrom and angularly spaced apart relative to each other. The arms each include an arcuately convex bottom surface 183 configured to engage an arcuately concave surface inside the bottom head 102 of the reactor vessel 100 which receives the fuel core. The lower core plate 126 may contain polygonal shaped notches 184 which engage and locate each arm 182 of the support member 180 (see also FIG. 17-19). The core support member 180 raises the core above the bottom of the reactor vessel 100 and defines a bottom flow plenum 178 beneath the lower core plate 126. Flow traveling downwards from the annular downcomer 108 of the reactor vessel enters flow plenum 178 and reverses direction to then flow upwards through the flow orifices 146 of the lower core plate into the channel boxes 130 and fuel assemblies 124. The bottom head 102 of reactor vessel 100 may include a drain nozzle 179 in fluid communication with the bottom flow plenum 178 for draining primary coolant out of the reactor vessel. In some non-limiting embodiments, the support member 180 may be welded to the lower core plate and/or the lower-most segment 122 of the cylindrical reflector 121. Support member 180 may be preferably made of a suitable strong corrosion resistant metal, such as stainless steel as one non-limiting example.

Figure 28:
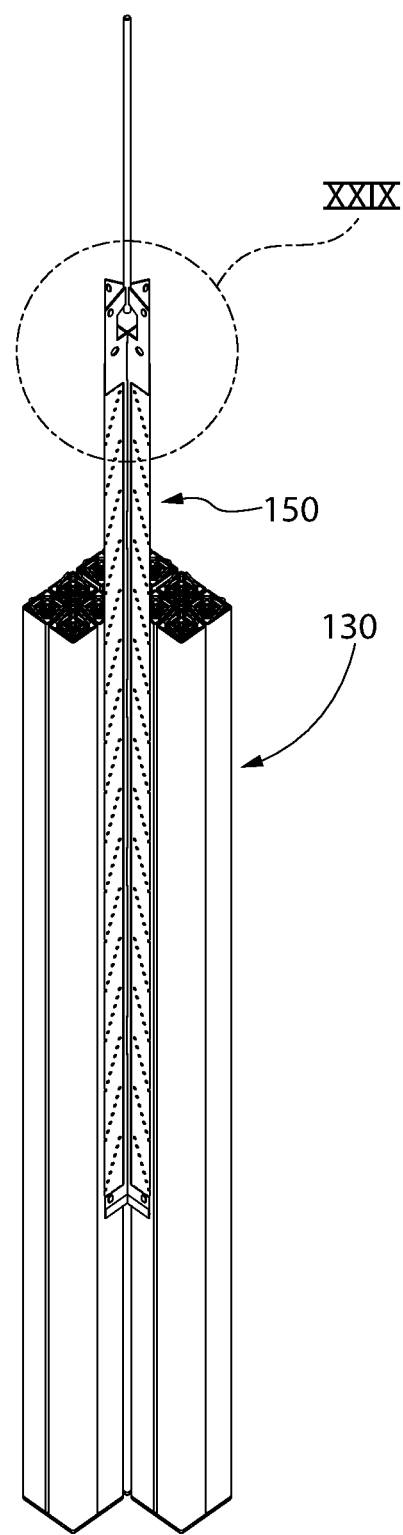
FIG. 28 is a perspective view of a cluster of three channel boxes showing a cruciform control rod partially inserted between the boxes in a water gap.
Figure 29:
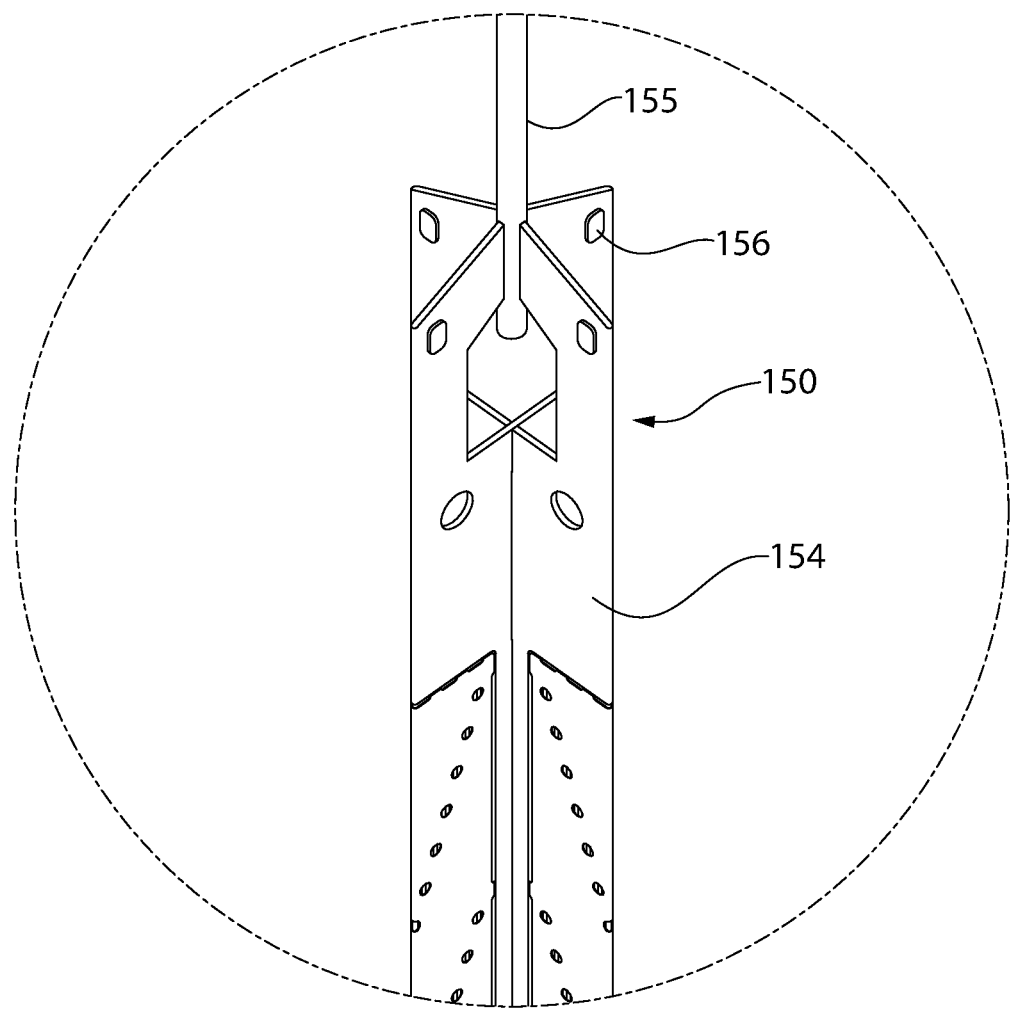
FIG. 29 is a close-up taken from FIG. 28 showing details of the control rod construction.

FIGS. 28-30 show the cruciform control rod assembly in greater detail. Each control rod 150 comprises a cylindrical shaft 155 having a top end configured to engage a control rod drive mechanism (not shown) mounted above the fuel core 120 and a plurality of perpendicularly intersecting blades 154 coupled to a bottom end of the shaft. The blades 154 are arranged to form a cruciform shape in transverse cross section as shown. The blades may incorporate a neutron absorbing material such as for example without limitation B4C (boron carbide) powder, hafnium plates, a combination thereof, or other materials. The blades may be formed of metal plates such as steel or zircalloy creating a structure that forms the cruciform. To facilitate smooth sliding insertion of the control rods 150 into the peripheral water gaps 157 created between the channel boxes 130 such as in the corner regions between adjacent channel boxes in the core as shown (see, e.g. FIGS. 30-31), the blades 154 may optionally include one or more protruding sliding bearing 156 which may be a raised protrusion or tab, roller type bearing, ball, or other element on the blade which functions as a bearing to slideably engage the sidewalls of the channel boxes 130 when the blades are moved upwards/downwards in the fuel core 120.

Figure 43:
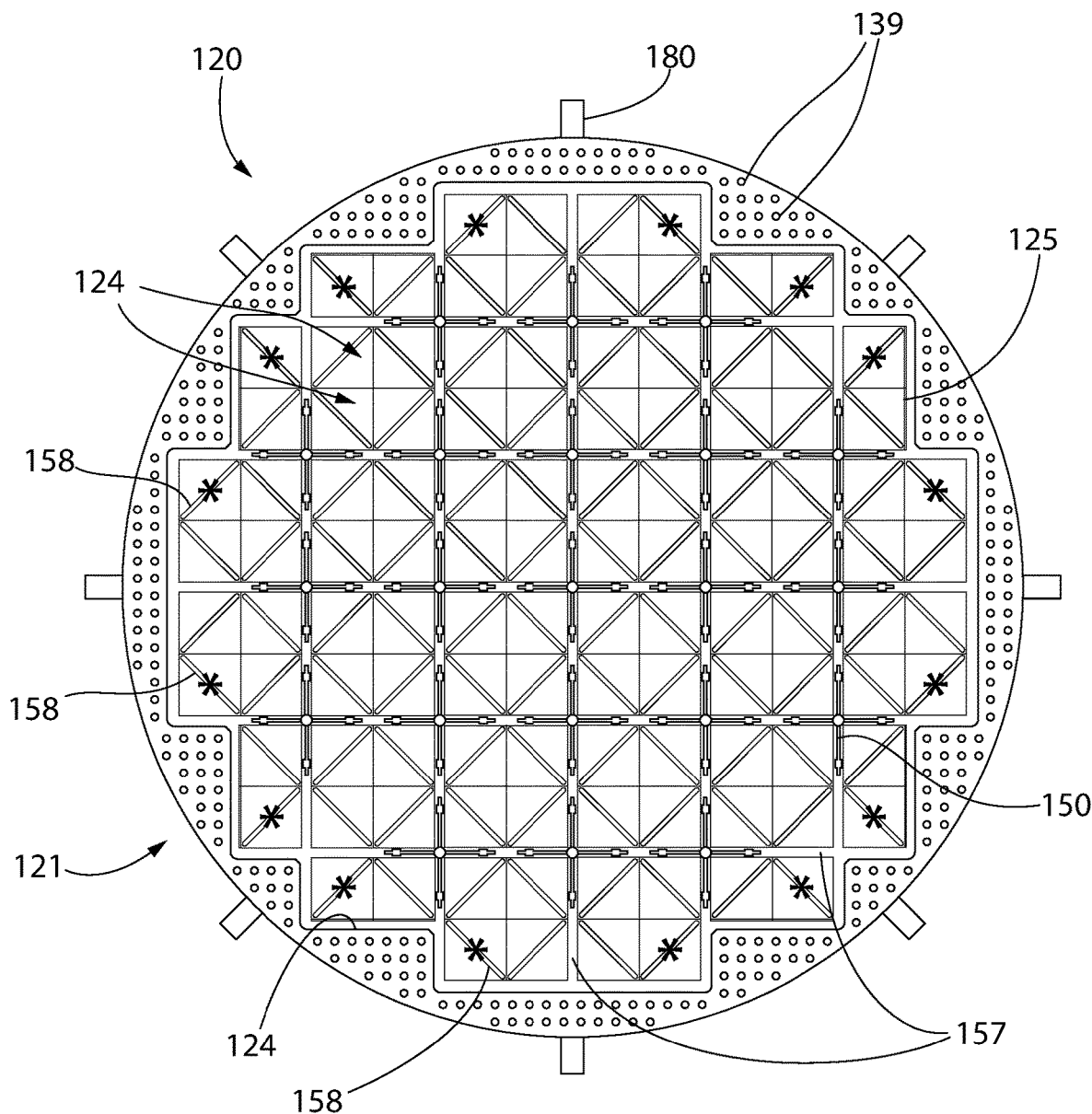
FIG. 43 is a top plan view of the fuel core showing a combination of fuel assemblies and neutron reflection inserts variously installed in select cells of the channel boxes.

In some embodiments, some of the peripheral channel boxes 130 of the fuel core 120 may have removably insertable reflector inserts 158 disposed in one or more of the cells 133 as shown in FIG. 43. Inserts 158 may be assemblies which may comprise either solid stainless steel pins or stainless steel tubes that contain neutron reflection materials for a number of purposes including, but not limited to, improved neutron economy for the reactor core and specific isotope production. These reflector assemblies facilitate varying reflector material axially to allow for optimization of power distributions in a reactor which has a large axial gradient in physical characteristics, such as in the present small modular reactor.

An exemplary method for assembling a nuclear reactor will be briefly described. The core support member 180, lower core plate 126, and lower-most reflector ring segment 122 may first be inserted into the reactor vessel 100. The lower core plate 126 is rotationally keyed to the reflector segment 122 via the raised annular anti-rotation lip 144 protruding upwards from a top surface of the lower core plate. The support member 180 engages the bottom head 102 of the reactor vessel. Additional reflector segments 122 may next be stacked upon the already emplaced segment 122 one by one to build up successive courses of the segments until the complete reflector 121 is created. The channel boxes 130 may next be lowered into the reactor vessel 100 to abuttingly engage their bottom ends with a respective receptacle 143 in the lower core plate 126. A single fuel assembly 124 is lowered into the rev and inserted into each channel box 130. The control rods 150 may next be inserted into the core between the channel boxes 130 in the peripheral water gaps 157 at the positions described and shown herein. This essentially completes the lower internals unit 112 installation in the reactor vessel.

The fully preassembled self-supporting upper internals unit 110 may next be positioned over and lowered into the reactor vessel and stacked on top of the cylindrical reflector 121. In the process, specifically, the upper core plate 125 of the upper internal unit is engaged with and rotationally keyed to the upper-most reflector segment 122 via the mating multiple stepped surfaces 200, 190 of the reflector segment and upper core plate respectively. This ensures proper alignment of the cruciform control rod openings 171, 170 in the upper core and intermediate support plates 125, 139 respectively. When the upper and lower internals units 110 and 112 (i.e. fuel core 120) are therefore now stacked together in the reactor vessel 100, each channel box 130 of the core will be vertically aligned with a corresponding flow tube 166 of the upper internals unit creating an array of unified primary coolant flow paths from the bottom flow plenum 178 at bottom end of the reactor vessel to the outlet nozzle 106 near the top. Additional remaining preparations may be completed and the top head 101 of the reactor vessel 100 may eventually be closed.

When core refueling is required, the reactor vessel is opened and the upper internals unit 110 is first removed. The control rods 150 remain in place within the fuel core 120 to control reactivity during the refueling outage. The required fuel assemblies 124 are removed and replaced as needed.

While the foregoing description and drawings represent exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A nuclear fuel core for supporting nuclear fuel assemblies, the fuel core comprising:
   a longitudinal axis;
   an upper core plate;
   a lower core plate;
   a plurality of vertically elongated channel boxes extending between the upper and lower core plates, each channel box comprising outer walls and inner walls collectively defining a plurality of longitudinally-extending interior cells each having a transverse cross sectional area configured for holding no more than a single nuclear fuel assembly;
   a cylindrical reflector circumferentially surrounding the channel boxes, the upper and lower core plates coupled to opposing ends of the reflector;
   wherein adjacent cells within each channel box are separated from each other by the inner walls;
   wherein the channel boxes have a rectilinear transverse cross-sectional shape and the inner walls have edges that perpendicularly intersect the outer walls.

2. The fuel core according to claim 1, wherein the upper core plate is an open grid structure engaging upper portions of the channel boxes and defining a plurality of rectilinear open cells each axially aligned with one of the cells of the channel boxes.

3. The fuel core according to claim 2, wherein the upper core plate has a polygonal-shaped perimeter with a multiple stepped configuration which engages a complementary configured multiple stepped interior surface of the cylindrical reflector to operably key and lock the upper core plate in rotational position relative to the cylindrical reflector.

4. The fuel core according to claim 1, wherein the lower plate core plate comprises a planar circular body defining an array comprising a plurality of upwardly open receptacles each complementary configured to and engaging a respective bottom end of one of the channel boxes for support.

5. The fuel core according to claim 4, wherein the lower plate core further comprises a plurality of upstanding guide walls arranged in a perpendicularly intersecting array, the guide walls operable to guide the bottom ends of the channel boxes into the upwardly open receptacles of the lower core plate when the channel boxes are inserted into the fuel core.

6. The fuel core according to claim 4, further comprising a polygonal-shaped raised annular anti-rotation lip protruding upwards from a top surface of the lower core plate and extending circumferentially around a peripheral portion of the lower core plate, the anti-rotation lip having a multiple stepped configuration which matches and engages a complementary configured multiple stepped interior surface of the cylindrical reflector to operably key and lock the lower core plate in rotational position relative to the cylindrical reflector.

7. The fuel core according to claim 6, wherein anti-rotation lip is inserted inside a bottom end of the cylindrical reflector and peripheral portions of the circular body of the lower core plate outboard of the anti-rotation lip engage a downward facing bottom end surface of the cylindrical reflector.

8. The fuel core according to claim 4, wherein at least some of the receptacles comprise a cruciform support surface which engages a complementary configured cruciform bottom end surface of each channel box.

9. The fuel core according to claim 1, further comprising a bottom open space frame core support member abuttingly engaging bottom surfaces of the cylindrical reflector and the lower core plate to support the reflector and lower core plate.

10. The fuel core according to claim 9, wherein the core support member comprises a vertically-extending central hub and plurality of arms extending radially therefrom and angularly spaced apart relative to each other.

11. The fuel core according to claim 10, wherein the arms each include an arcuately convex bottom surface configured to engage an arcuately concave bottom head surface inside a reactor vessel which receives the fuel core.

12. The fuel core according to claim 1, wherein the cylindrical reflector is formed of multiple vertically stacked metallic annular segments abutted together to form an integral structure.

13. The fuel core according to claim 12, wherein the cylindrical reflector includes a plurality of vertically cooling conduits extending from a top to a bottom of the reflector for cooling the reflector.

14. The fuel core according to claim 1, wherein the channel boxes includes a combination of rectangular channel boxes having a rectangular transverse cross-sectional shape disposed around exterior portions of the fuel core and square channel boxes having square transverse cross-sectional shapes.

15. The fuel core according to claim 14, wherein the outer walls of the square channel boxes are formed by a plurality of L-shaped structural members welded together along their longitudinal edges to form the square transverse cross sectional shape, and the inner walls are formed by a pair of L-shaped structural members having abutted mating corners and longitudinal edges welded to the outer walls forming a cruciform transverse cross sectional shape of the inner walls.

16. A nuclear fuel core for supporting nuclear fuel assemblies, the fuel core comprising:
   a longitudinal axis;
   an upper core plate;
   a lower core plate;
   a plurality of vertically elongated channel boxes extending between the upper and lower core plates, each channel box comprising outer walls and inner walls collectively defining a plurality of longitudinally-extending interior cells each having a transverse cross sectional area configured for holding no more than a single nuclear fuel assembly;
   a cylindrical reflector circumferentially surrounding the channel boxes, the upper and lower core plates coupled to opposing ends of the reflector; and
   an upper internals unit stacked vertically on top of the cylindrical reflector, the upper internals unit comprising a plurality of vertically oriented flow tubes axially aligned with and in fluid communication with the cells of the channel boxes;
   wherein adjacent cells within each channel box are separated from each other by the inner walls.

17. The fuel core according to claim 1, wherein the outer walls of each channel box is transversely spaced apart from adjacent channel boxes by peripheral water gaps.

18. The fuel core according to claim 17, further comprising a plurality of cruciform control rods disposed in the peripheral gaps between adjacent corner regions of the channel boxes, the control rods selectively insertable through cruciform openings in the upper core plate into the fuel core in the water gaps.

19. A nuclear fuel core for supporting nuclear fuel assemblies, the fuel core comprising:
   a longitudinal axis;
   an upper core plate;

a lower core plate;

a plurality of vertically elongated channel boxes extending between the upper and lower core plates, each channel box comprising outer walls and inner walls collectively defining a plurality of longitudinally-extending interior cells each having a transverse cross sectional area configured for holding no more than a single nuclear fuel assembly;

a cylindrical reflector circumferentially surrounding the channel boxes, the upper and lower core plates coupled to opposing ends of the reflector;

wherein adjacent cells within each channel box are separated from each other by the inner walls;

wherein the upper core plate is an open grid structure engaging upper portions of the channel boxes and defining a plurality of rectilinear open cells each axially aligned with one of the cells of the channel boxes; and wherein the upper core plate has a polygonal-shaped perimeter with a multiple stepped configuration which engages a complementary configured multiple stepped interior surface of the cylindrical reflector to operably key and lock the upper core plate in rotational position relative to the cylindrical reflector.

\* \* \* \* \*